United States Patent
Maniscalco et al.

(10) Patent No.: US 7,278,238 B2
(45) Date of Patent: Oct. 9, 2007

(54) FALSE BOTTOM INSERT ASSEMBLY FOR AN OVERSIZED PLANTER CONTAINER

(76) Inventors: Kristine Ann Maniscalco, 1653 Warrington La., Crystal Lake, IL (US) 60014; John Jeffrey Maniscalco, 1653 Warrington La., Crystal Lake, IL (US) 60014

( * ) Notice: Subject to any disclaimer, the term of this patent is extended or adjusted under 35 U.S.C. 154(b) by 0 days.

(21) Appl. No.: 11/400,658

(22) Filed: Apr. 7, 2006

(65) Prior Publication Data
US 2006/0179716 A1 Aug. 17, 2006

Related U.S. Application Data

(62) Division of application No. 10/655,921, filed on Sep. 5, 2003, now Pat. No. 7,024,818.

(51) Int. Cl.
*A01G 9/02* (2006.01)
(52) U.S. Cl. .............. 47/65.6; 47/65.5; 47/63; 47/66.7
(58) Field of Classification Search ............... 47/69, 47/65.6, 59 R, 64, 63, 62 R, 65.5, 66.7, 71; 99/516
See application file for complete search history.

(56) References Cited

U.S. PATENT DOCUMENTS

| 866,449 | A | | 9/1907 | Feist | |
|---|---|---|---|---|---|
| 1,077,423 | A | * | 11/1913 | Myers | 47/67 |
| 1,251,552 | A | * | 1/1918 | Marks | 47/80 |
| 2,055,844 | A | | 9/1936 | Kneller | |
| 2,130,234 | A | * | 9/1938 | Haglund | 47/80 |
| 2,140,932 | A | | 12/1938 | Avery | |
| 2,238,132 | A | | 4/1941 | Ritter | |
| 2,253,817 | A | | 8/1941 | Simmons | |
| 2,463,719 | A | | 3/1949 | Schackett et al. | |
| 2,484,909 | A | | 10/1949 | Ritter | |
| 3,475,858 | A | | 11/1969 | Flannigan | |
| 3,804,331 | A | | 4/1974 | Levey | |
| 3,823,508 | A | * | 7/1974 | Takehara | 47/63 |
| 3,975,860 | A | * | 8/1976 | Harned et al. | 47/81 |

(Continued)

FOREIGN PATENT DOCUMENTS

DE 1632909 5/1977
EP 1060655 A * 12/2000

*Primary Examiner*—Andrea M. Valenti
(74) *Attorney, Agent, or Firm*—Meroni & Meroni, P.C.; Charles F. Meroni, Jr.; Christopher J. Scott

(57) ABSTRACT

An insert assembly is used in combination with a planter container for creating a false bottom therein. The assembly essentially comprises a support platform for supporting a soil-bound plant, an optional spacer member for supporting the support platform, and an optional moisture-receiving tray for collecting and retaining excess moisture emanating from the support platform and the spacer member via the soil. The platform comprises a peripheral support surface that engages either the container or the spacer member for supporting the support platform at the chosen false bottom level in the planter container. Support ribs are integrally formed to the platform to increase its load bearing potential. The spacer member may be utilized as an optional structure to adjust for variable container dimensions and the moisture-receiving tray may be installed at the user's election to maintain a moisture source in inferior adjacency to the support platform.

3 Claims, 18 Drawing Sheets

U.S. PATENT DOCUMENTS

| | | |
|---|---|---|
| 4,014,506 A | 3/1977 | Hanson |
| 4,077,159 A | 3/1978 | Haglund |
| 4,102,081 A * | 7/1978 | Morrow .................. 47/67 |
| 4,106,235 A | 8/1978 | Smith |
| 4,173,098 A | 11/1979 | Smith |
| 5,103,587 A | 4/1992 | Holler |
| 5,315,783 A | 5/1994 | Peng |
| D352,479 S | 11/1994 | Carlson |
| D352,480 S | 11/1994 | Carlson |
| D382,512 S * | 8/1997 | Hulsebus .................. D11/152 |
| 5,722,201 A | 3/1998 | Diorio et al. |
| 5,983,566 A | 11/1999 | Enderlein et al. |
| 6,125,579 A * | 10/2000 | Pavelka .................. 47/79 |
| 6,247,269 B1 * | 6/2001 | Valiquette .................. 47/81 |
| 6,615,540 B1 | 9/2003 | Muller |
| 2001/0052199 A1 * | 12/2001 | Klein et al. .................. 47/65.5 |
| 2003/0106262 A1 | 6/2003 | Lai |

* cited by examiner

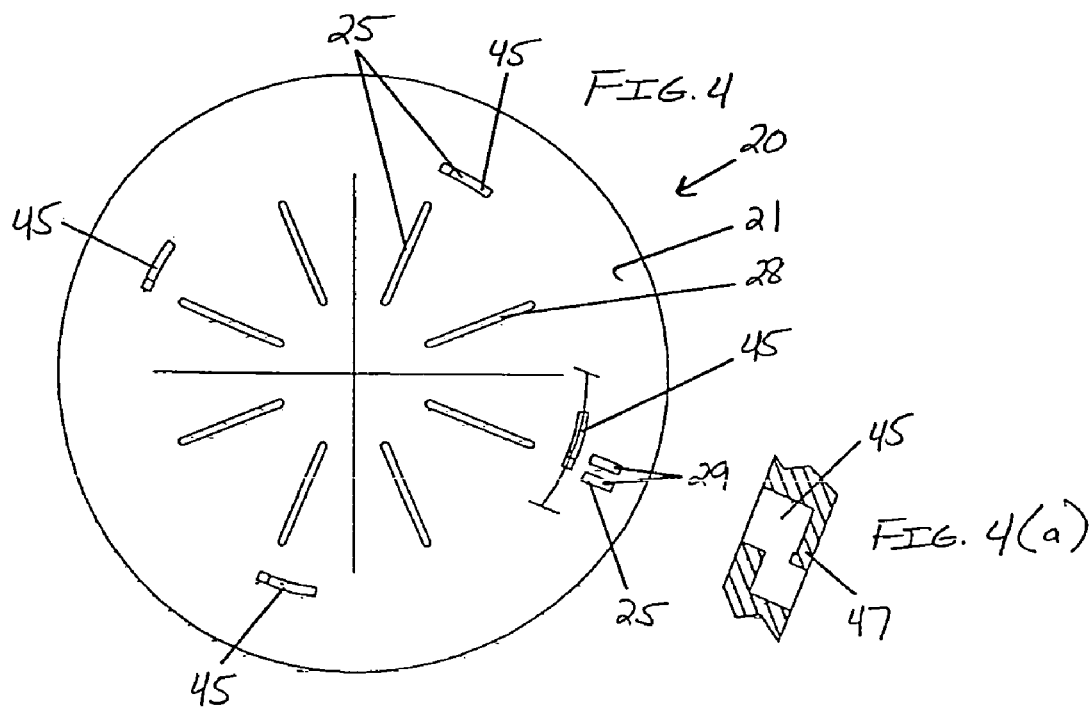
FIG. 4
FIG. 4(a)
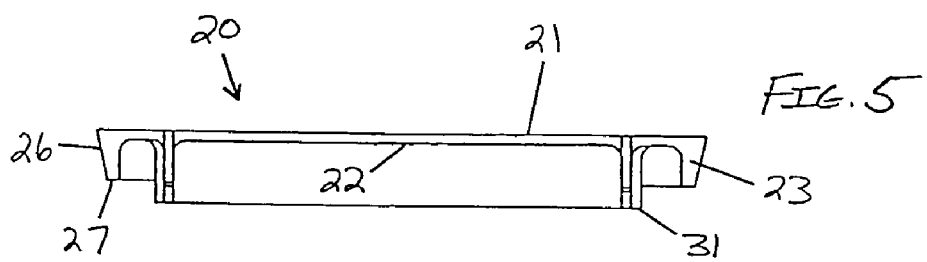
FIG. 5
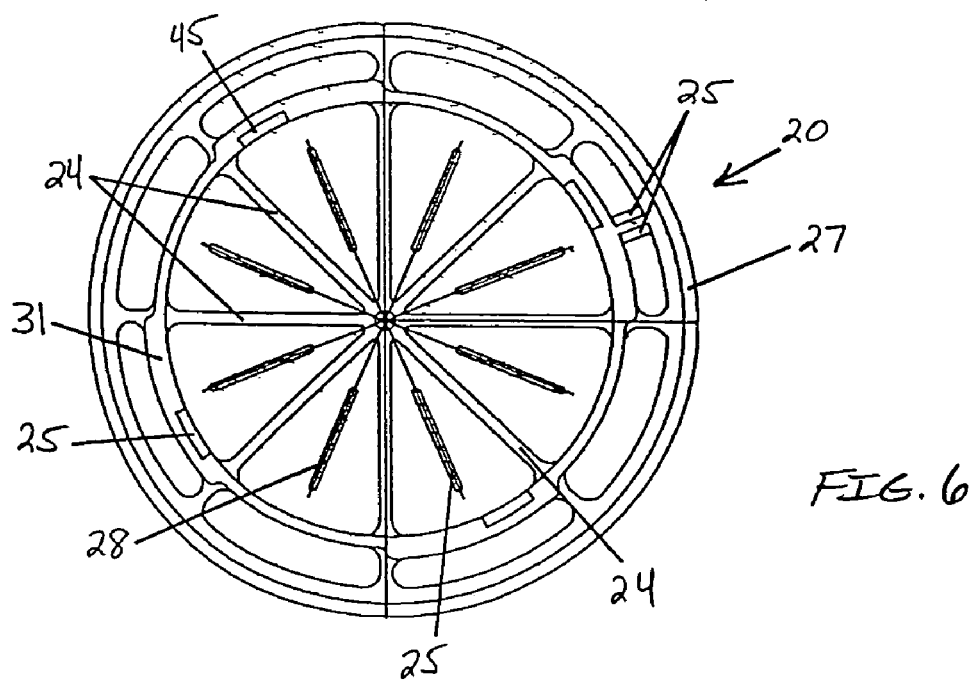
FIG. 6

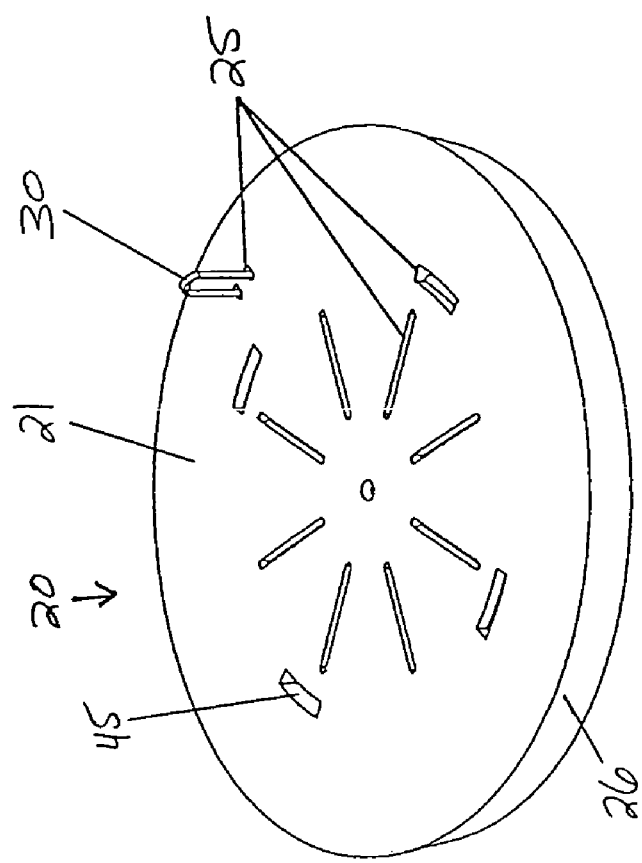
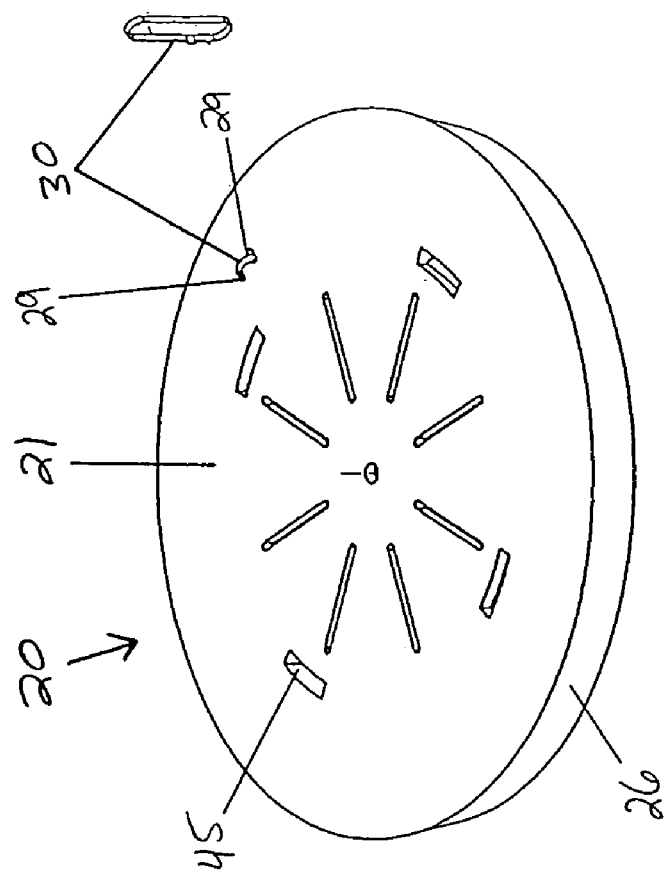
FIG. 17(a)
FIG. 17(b)

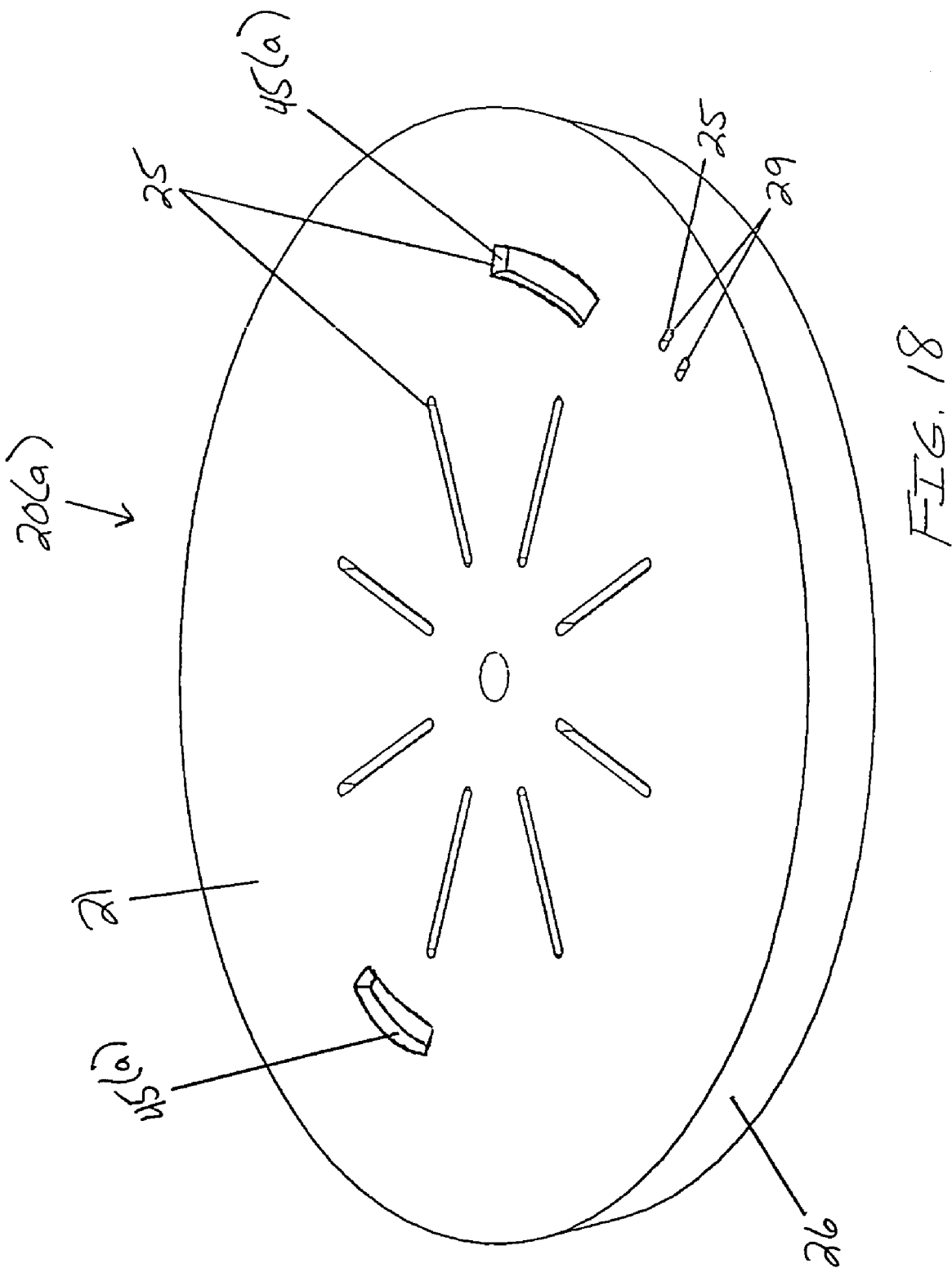

FALSE BOTTOM INSERT ASSEMBLY FOR AN OVERSIZED PLANTER CONTAINER

PRIOR HISTORY

This is a Divisional Patent Application claiming priority to U.S. patent application Ser. No. 10/655,921, filed in the United States Patent and Trademark Office on Sep. 5, 2003 now U.S. Pat. No. 7,024,818.

BACKGROUND OF THE INVENTION

1. Field of the Invention

The present invention generally relates to an insert or an insert assembly for use in combination with containers so as to create a false bottom therein. More particularly, the present invention relates to a planter insert or a planter insert assembly, which when inserted into an oversized planter container, creates a false bottom therein. The present invention thus provides users with a means to make more efficient use of oversize planter containers by reducing the need for excess container fill material and thus reducing overall container mass.

2. Description of the Prior Art

Gardening is an activity that continues to grow in popularity providing a source of personal satisfaction, providing aesthetic pleasure, the opportunity for relief from daily stresses, and a number of other benefits unique to any given gardener. A great deal of gardening activity is geared toward embellishing the traditional landscape or ground-level plantings. An increasing number of gardeners, however, are discovering the advantages of gardening in planters, containers, and raised beds, which practice is often referred to as "container gardening." These container gardening styles can be adapted to make gardening easier for older gardeners or individuals with physical disabilities. Container gardening is also adaptable for gardening in a small backyard, an apartment patio, or on the grounds of a retirement home or hospital. Further, so-called container gardening is often practiced with larger sized planter containers or oversized planter containers, which may typically be found in and around shopping malls or along streets adjacent buildings. Oversized planter containers often serve the double function of providing public areas and other suitable environs with decorative surroundings as well as provide buildings and passersby with an added measure of safety. In this last regard, it is noted that oversized planter containers are often intended as vehicular barricades to thwart errant traffic from entering walkways and the like.

Notably, the plant life that is placed or potted in oversized planter containers often have relatively shallow root systems when compared to the depth of the oversized planter container and thus require only modest amounts of soil adjacent the rim of the oversized planter container. Furthermore, oversize planter containers, when empty, typically have sufficient mass to safely provide effective errant vehicle barricades. Completely filling oversized planter containers with soil, rock, and other fill materials often makes the oversized planter container unwieldy and exceedingly difficult to transport requiring costly heavy-duty equipment or machinery and the services of heavy equipment operators. Container garden enthusiasts may thus find cost savings in the ability to reduce soil needs as well as other costly fill materials and services in gardening with oversized planter containers.

When considering container gardening, it is often helpful to look to prior disclosures to ascertain the state of the art. In this regard, it is noted that different types of planter containers and devices for use in combination therewith are disclosed in the prior art. Some of the more pertinent prior art relating to planter containers and the assorted devices is described hereinafter.

U.S. Pat. No. 866,449 ('449 Patent), which issued to Feist, discloses a Jardinière. The '449 Patent teaches a jardinière having a body with transversely disposed bars in the lower portion thereof, said bars having their ends embedded in the wall of said body and being adapted to support a potted plant within said body. In another embodiment, the jardinière comprises transversely disposed bars in the lower portion thereof, a block supported on said bars and adapted to support a potted plant thereabove.

U.S. Pat. No. 2,140,932 ('932 Patent), which issued to Avery, discloses a Pot or Container. The '932 Patent teaches a planter insert comprising an upper band section and a lower section formed from flexible material, which is formed to adapt into a planter or frustoconical shape for raising seedlings. When seedlings are transferred to a permanent site, the insert member is destined to disintegrate in the soil.

U.S. Pat. No. 2,463,719 ('719 Patent), which issued to Schackett et al., discloses an Interchangeable Plant and Flower Receptacle. The '719 Patent teaches a flower receptacle comprising a inner supporting means positioned on opposite side walls, the upper surface of said supporting means being positioned below the upper level of said receptacle, a plurality of frames formed to support said flower carrying means and adapted to rest on said supporting means, said supporting means being U-shaped in cross-section and having drainage apertures in the horizontal faces thereof permitting drainage into said receptacle of excess water poured on plants in said flower carrying means, each of said frames having laterally extending latch members at opposite sides thereof, the distance between the inner faces of said latch members being arranged so as to cause said latch members to be in contacting relation only with the inner walls of said U-shaped member to form predetermined vertical openings communicating with said drainage apertures.

U.S. Pat. No. 3,475,858 ('858 Patent), which issued to Flannigan, discloses a Planter Shroud and Planter. The '858 Patent teaches a shroud for a planter of the type employed in malls for towns and cities. The shroud is in the form of a hollow body with an open bottom for positioning over the planter, the top of the shroud including an inwardly and downwardly directed lip defining a central opening through which the plant in the planter extends when the shroud is positioned over the planter. By use of such a shroud, the planter may readily be provided with a dressed appearance and the planter itself, being completely hidden by the shroud can be manufactured without the normal lip structure and thus susceptible to a matched steel die single molding operation.

U.S. Pat. No. 4,173,098 ('098 Patent), which issued to Smith, discloses a Planter. The '098 Patent teaches a receptacle having an imperforate bottom with a perforated, horizontal wall spaced upwardly from the bottom and dividing the receptacle into upper and lower compartments. Tubes project through the perforated wall and extend upwardly above the upper edge of the receptacle and downwardly to the bottom of said receptacle. Lower end portions of the tubes below the horizontal wall are also perforated. The upper compartment is adapted to receive soil and the lower compartment receives excess water which evaporates through the tubes and keeps the soil moist.

U.S. Pat. No. 6,125,579 ('579 Patent), which issued to Pavelka, discloses a Drainage Disk and Reservoir System for a Planter. The '579 Patent teaches a disk shaped insert for use in conjunction with an elevated bottom drain in a plant container. The disk rests on the drain to create a water reservoir below the disk. Excessive water is permitted to escape the container through the drain. The soil is held above the reservoir by the disk.

From a review of these patents and other prior art generally known in the relevant art, it will be seen that the prior art does not teach a container insert or insert assembly designed for use in combination with an oversized planter pot or oversized planter container for creating a false bottom in the same wherein the container insert assembly comprises a container insert or soil support platform, a support spacer member, and an optional moisture-receiving tray. More specifically, it will be seen that that the prior art does not teach a soil support platform comprising a substantially planar superior support surface, a substantially planar inferior support surface, a peripheral support ridge, a plurality of support ribs, and a plurality of matter-receiving apertures. Neither does the prior art teach a support spacer member as a means for enabling users to more effectively position a false bottom at a select container periphery as well as a means for enabling users to form a false bottom in planter containers having open mouth or inner container diameter dimensions that greatly exceed the dimensions of the soil support platform. In this regard, it is further noted that the prior art does not teach a support spacer member comprising a substantially planar superior spacer surface, a substantially planar inferior spacer surface, a sloped outer peripheral surface, a sloped inner peripheral surface, a horizontal spacer thickness, and a platform support ridge.

Further, it will be seen that the prior art does not teach an optional moisture-receiving tray for capturing and retaining excess moisture that may drain from the matter-receiving apertures of the soil support platform. In this regard, it is noted that the prior art does not teach a moisture-receiving tray comprising a superior moisture-collecting tray surface, an inferior tray surface, a peripheral tray surface or rim, and a plurality of tray ribs.

The prior art thus perceives a need for a container insert or insert assembly designed for use in combination with an oversized planter pot or oversized planter container for creating a false bottom in the same. In this regard, the prior art perceives a need for a container insert or insert assembly designed for use in combination with an oversized planter pot or oversized planter container to increase the efficiency of soil usage. In this regard, it is contemplated that the prior art perceives a need for a false bottom insert for oversized planter containers that will function to reduce the need to have excess stone, excess soil, or other types of excess fill material in those portions of an oversized planter container where root systems of plant life may not reach. The prior art thus perceives a need for a soil support platform comprising a substantially planar superior support surface, a substantially planar inferior support surface, a peripheral support ridge, and a plurality of support ribs for supporting soil in an elevated position above a container bottom. Further, it is contemplated that the prior art perceives a need for a false bottom insert assembly that will function to reduce the resulting mass of an oversized planter container when excess stone, excess soil or other types of excess fill material are placed into the container.

Further, the prior art perceives a need for a false bottom insert assembly that enables users to more effectively position a false bottom at a select container periphery as well as a false bottom that enables users to form a false bottom in planter containers having open mouth or inner container diameter dimensions that greatly exceed the dimensions of the soil support platform. In this regard, the prior art perceives a need for a support spacer member comprising a substantially planar superior spacer surface, a substantially planar inferior spacer surface, a sloped outer peripheral surface, a sloped inner peripheral surface, a horizontal spacer thickness, and a platform support ridge.

Further the prior art perceives a need for a false bottom insert assembly comprising a plurality of matter-receiving apertures. More specifically, the prior art perceives a need for a false bottom insert assembly that enables the user to prevent root rot by allowing excess moisture to drain from soil-bound root systems through moisture drain apertures in the insert assembly. Alternatively, the prior art perceives a need for an optional moisture-receiving tray usable in combination with a soil support platform and the support spacer member for capturing and retaining excess moisture from the matter-receiving or moisture drain apertures of the soil support platform. In this regard, it is noted that the prior art perceives a need for a moisture-receiving tray that comprises a superior moisture-collecting tray surface, an inferior tray surface, a peripheral tray surface or rim, and a plurality of tray ribs. The prior art thus perceives a need for a moisture-receiving tray that operates to provide a readily available moisture or water source for plant species requiring relatively large amounts of moisture. Still further, the prior art perceives a need to provide a false bottom insert assembly that provides a readily available moisture source for plants requiring less moisture, thus enabling the user to increase the interval time between watering episodes.

SUMMARY OF THE INVENTION

Accordingly, it is an object of the present invention to provide a low cost, container insert or insert assembly designed for use in combination with an oversized planter container for creating a false bottom in the same. In this regard, it is an object of the present invention to provide a container insert or insert assembly designed for use in combination with an oversized planter container that will enable the user to decrease the amount of soil needed to effectively maintain plant life in a viable state. It is a further object of the present invention to provide a false bottom insert for an oversized planter container that will function to reduce the need to have excess stone, excess soil, or other types of excess fill material in those portions of an oversized planter container where root systems of plant life may not reach.

Still further, it is an object of the present invention to provide a soil support platform that comprises a substantially planar superior support surface, a substantially planar inferior support surface, a peripheral support ridge, and a plurality of support ribs for supporting soil in an elevated position above an oversized planter container bottom. Further, it is an object of the present invention to provide a false bottom insert assembly that will function to reduce the overall mass of an oversized planter container when excess stone, excess soil or other types of excess or unnecessary fill material are placed into the containers.

It is a further object of the present invention to provide a false bottom insert assembly that enables users to more effectively position a false bottom at a user-selected or select container periphery. Further, it is an object of the present invention to provide a false bottom insert assembly that enables users to form a false bottom in a planter container having a mouth or inner container diameter dimension that greatly exceeds the dimensions of the superior support surface of the soil support platform. In this regard, it is a further object of the present invention to provide a support spacer member comprising a substantially planar superior spacer surface, a substantially planar inferior spacer surface, a sloped outer peripheral surface, a sloped inner peripheral surface, a horizontal spacer thickness, and a platform support ridge that is designed to engage the container at the select container periphery and receive and support the soil support platform.

It is a further object of the present invention to provide a false bottom insert assembly comprising a plurality of matter-receiving apertures. More specifically, it is an object of the present invention to provide a false bottom insert assembly that enables the user to prevent root rot by allowing excess moisture to drain from soil-bound root systems through moisture drain apertures in the insert assembly. Still further, it is an object of the present invention to provide an optional moisture-receiving tray usable in combination with a soil support platform and the support spacer member for capturing and retaining excess moisture from the matter-receiving or moisture drain apertures of the soil support platform. In this regard, it is a further object of the present invention to provide an optional moisture-receiving tray comprising a superior moisture-collecting tray surface, an inferior tray surface, a peripheral tray surface or rim, and a plurality of tray ribs. Thus, it is an object of the present invention to provide a moisture-receiving tray that operates to provide a readily available moisture source in inferior adjacency to the root systems of plants requiring relatively large amounts of moisture. Further, it is an object of the present invention to provide a readily available moisture source in inferior adjacency to the root systems of plants requiring lesser amounts of moisture to effectively enable the user to increase the interval time between watering episodes.

To achieve these and other readily apparent objectives, the present invention provides a container insert or an insert assembly designed for use in combination with an oversized planter pot or oversized planter container for creating a false bottom in the same. The container insert assembly comprises a container insert or soil support platform, a support spacer member, and an optional moisture-receiving tray. The soil support platform comprises a substantially planar superior support surface, a peripheral support ridge, a plurality of support ribs, and a plurality of matter-receiving apertures. The peripheral support ridge comprises a sloped peripheral support surface and a peripheral support rim. The peripheral support surface is that portion of the peripheral support ridge that lies intermediate the superior support surface and the peripheral support rim and engages either the container or the support spacer member for supporting the soil support platform at a level adjacent the select container periphery.

It will be understood that by placing soil or other matter atop the soil support platform, the soil support platform becomes more fixedly wedged in place at a level adjacent the select container periphery. The support ribs are integrally formed to the inferior support surface to provide the soil support platform with additional load bearing structure to withstand the various forces acting upon the soil support platform at any given point in time. The inferior support surface further comprises a tray support structure. The tray support structure is concentric within peripheral support ridge and comprises tray-supporting means for supporting the optional moisture-receiving tray.

The matter-receiving apertures are spaced intermediate the support ribs and extend from the superior support surface to the inferior support surface. The matter-receiving apertures may be defined by at least one moisture drain at least two tie strap-receiving apertures. In this last regard, it is contemplated that the insert assembly further comprise manual removal means for enabling a user to manually remove the soil support platform from engagement with either the select container periphery or the support spacer member. The manual removal means is preferably defined by at least one tie strap looped through the tie strap-receiving apertures.

Other objects of the present invention, as well as particular features, elements, and advantages thereof, will be elucidated in, or apparent from, the following description and the accompanying drawing figures.

BRIEF DESCRIPTION OF THE DRAWINGS

Other features of our invention will become more evident from a consideration of the following brief description of patent drawings, as follows:

Figure No. 1 is a cross sectional side view of the preferred embodiment of the false bottom insert assembly inserted in an oversized planter container supporting a soil-bound plant.

Figure 1:
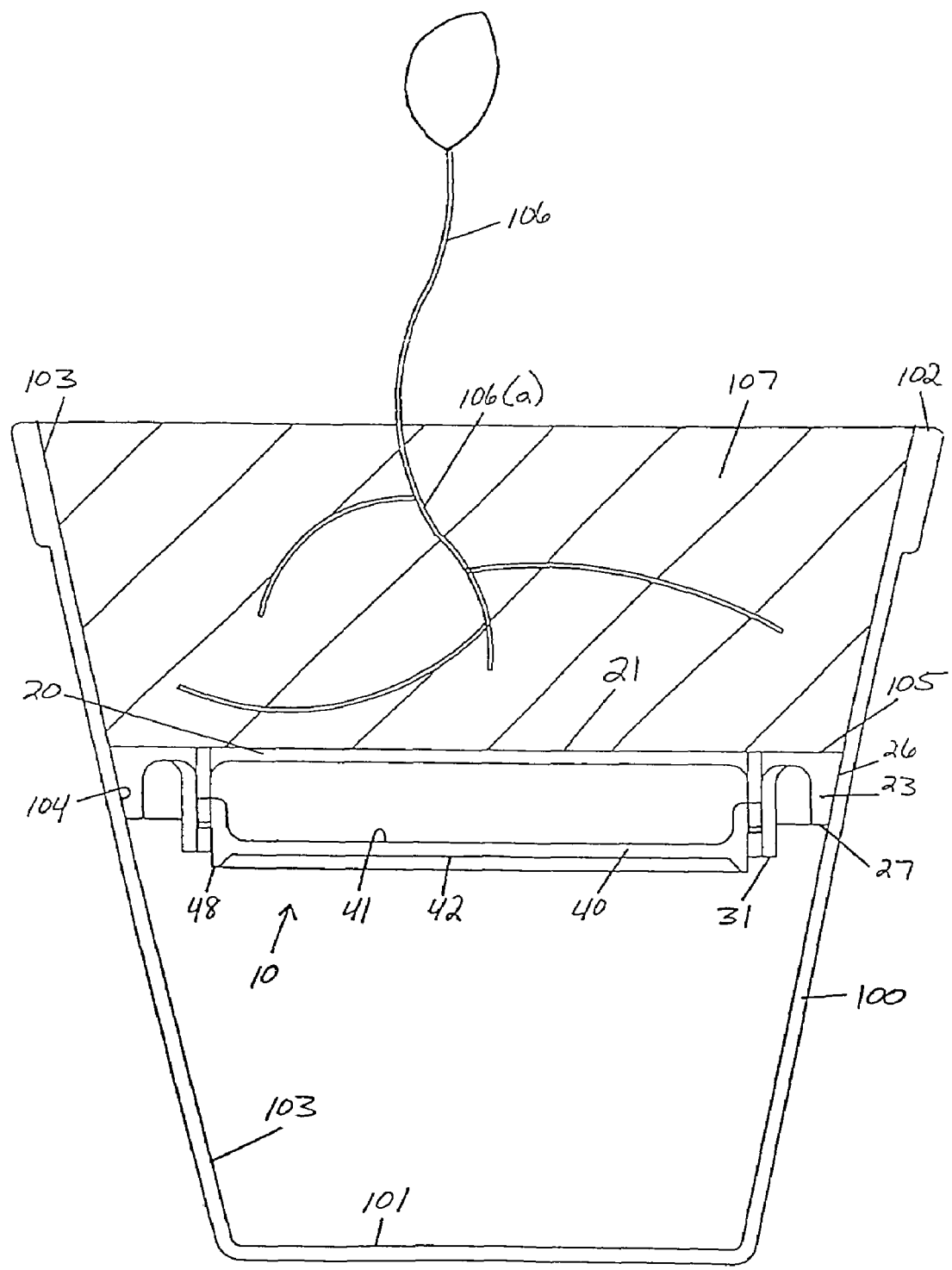
Figure 2:
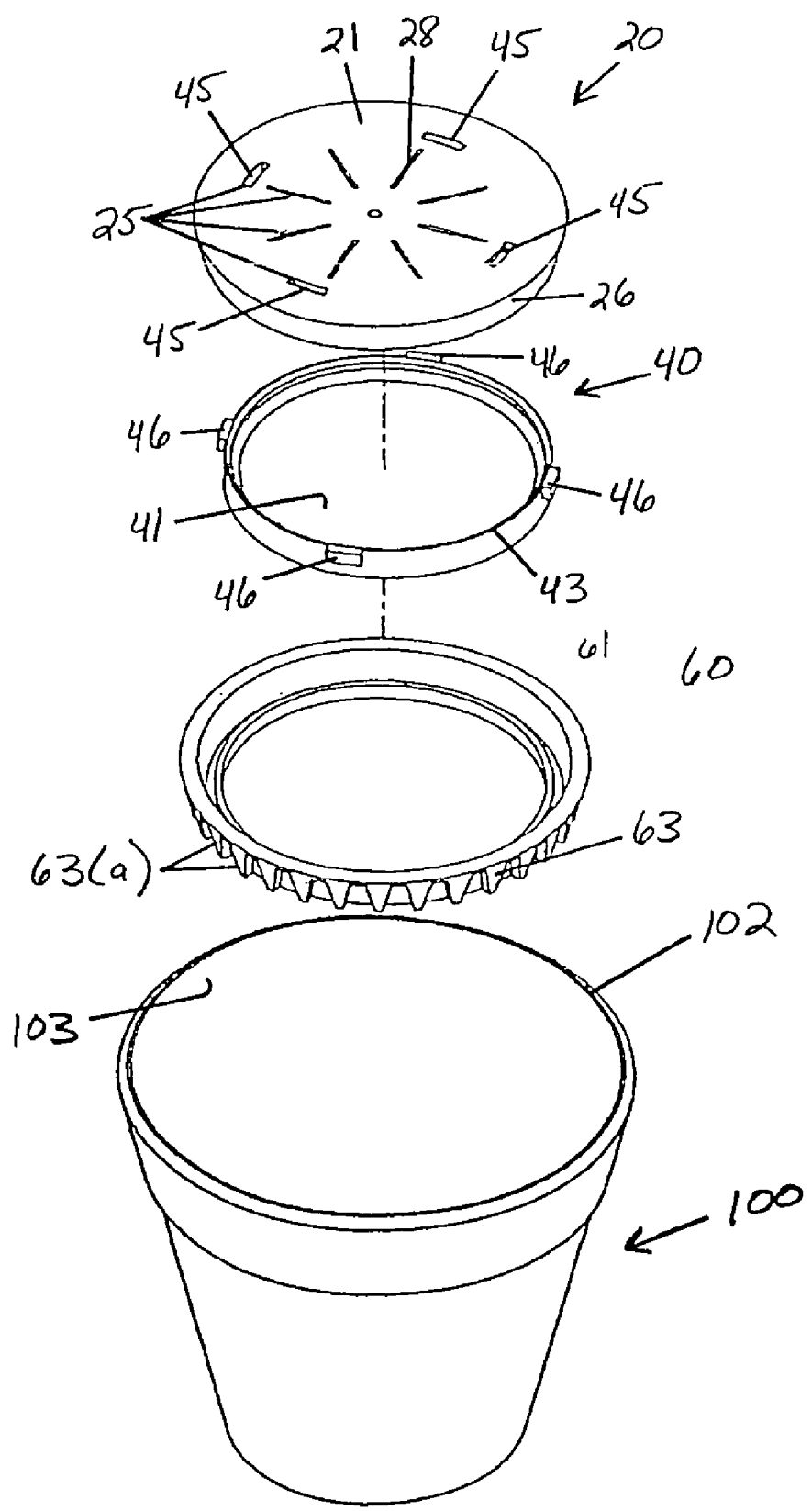
Figure 3:
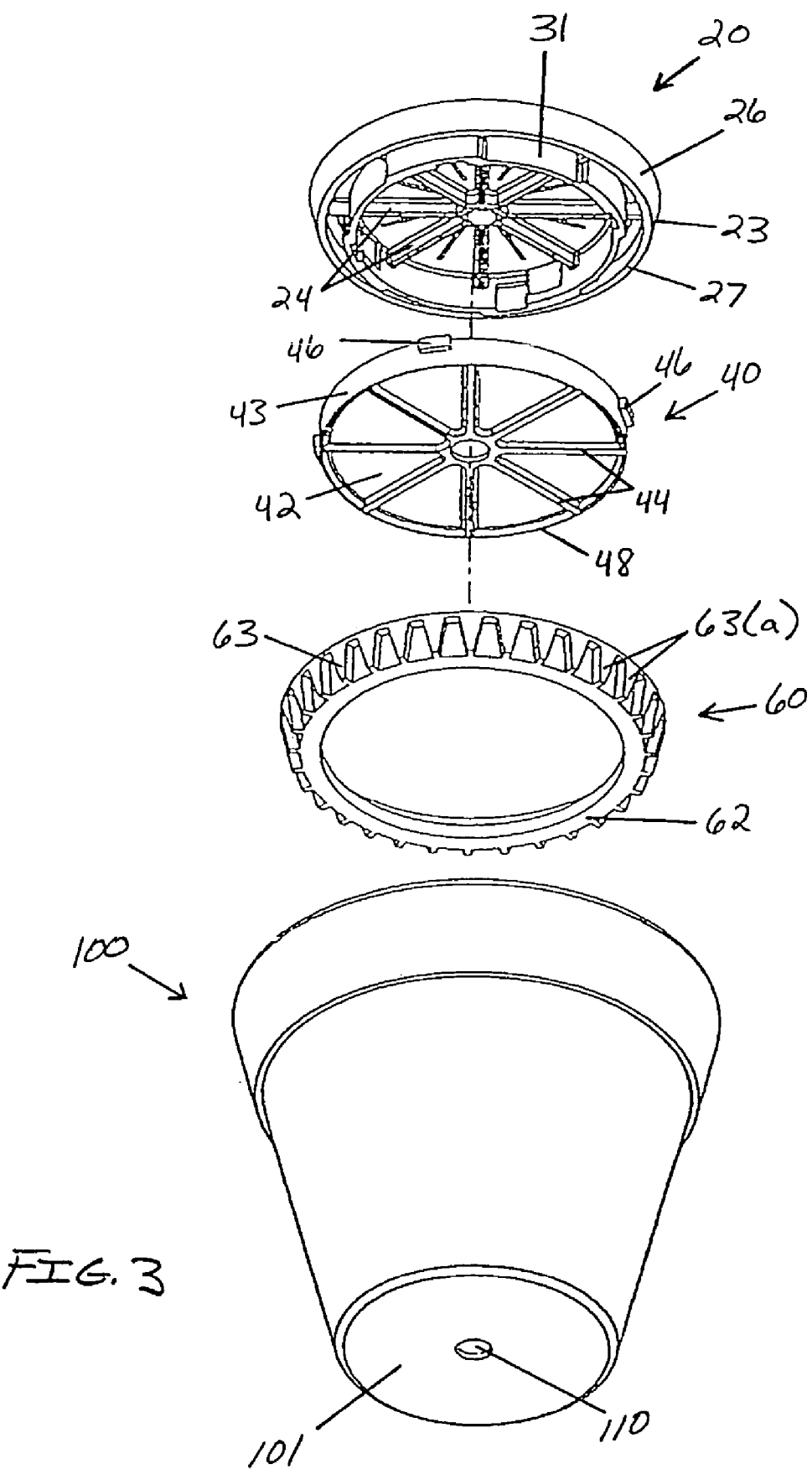
Figure 7:
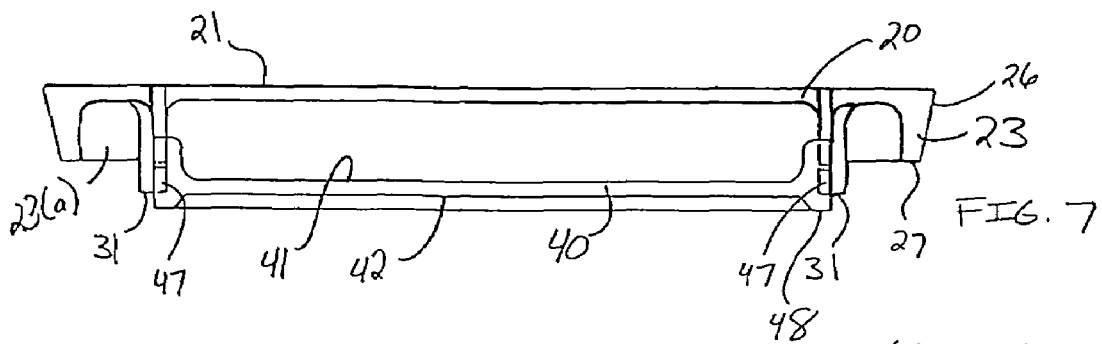
Figure 8:
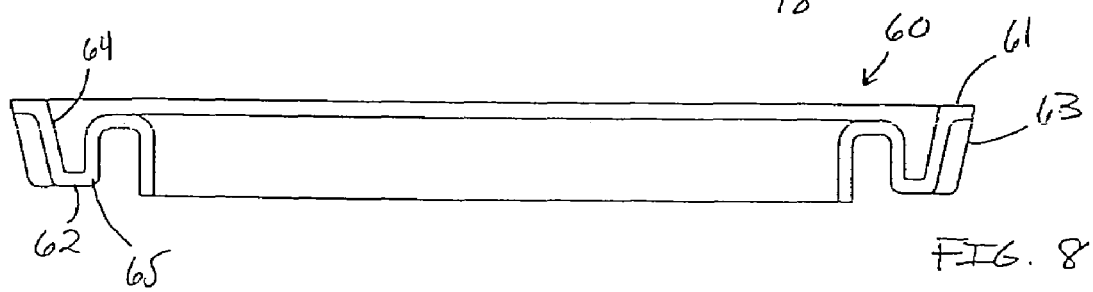
Figure 9:
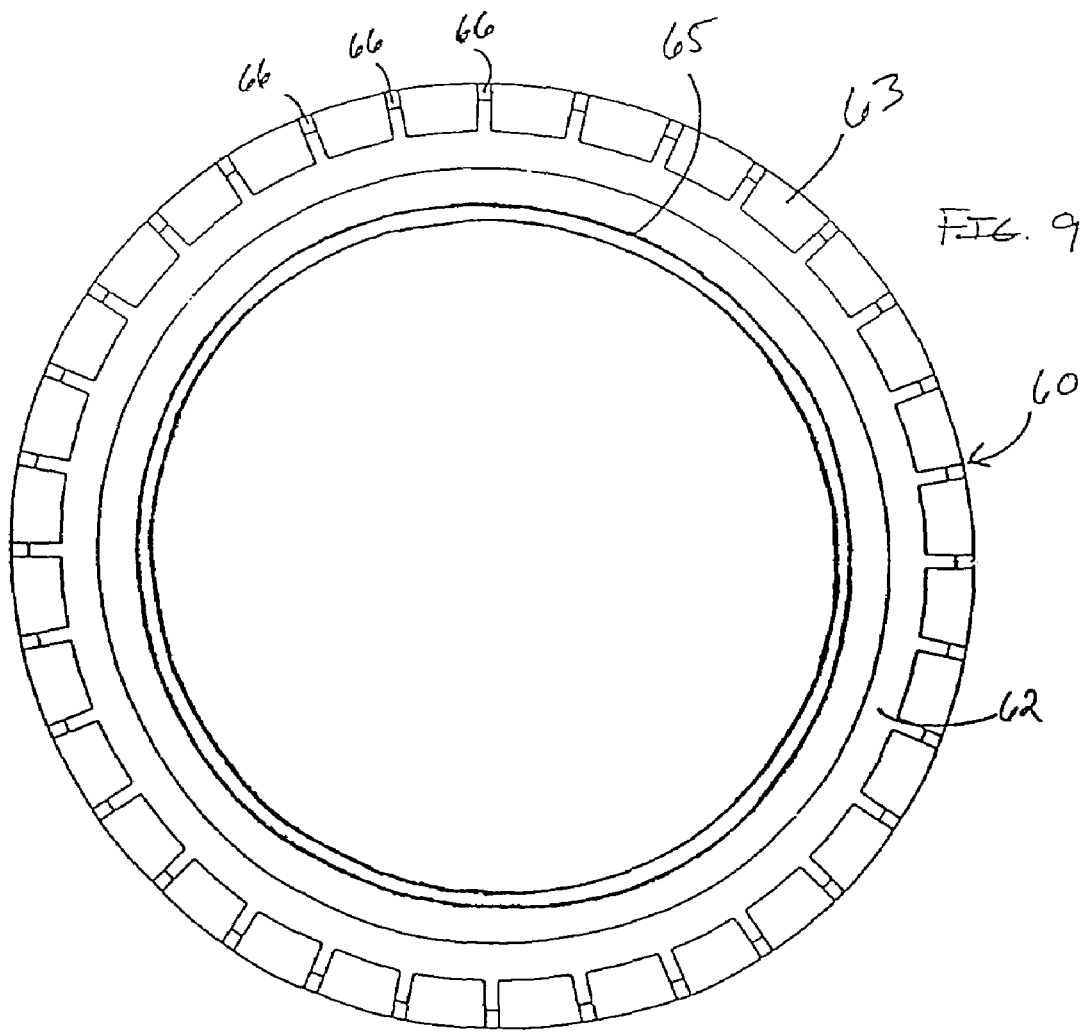
Figure 10:
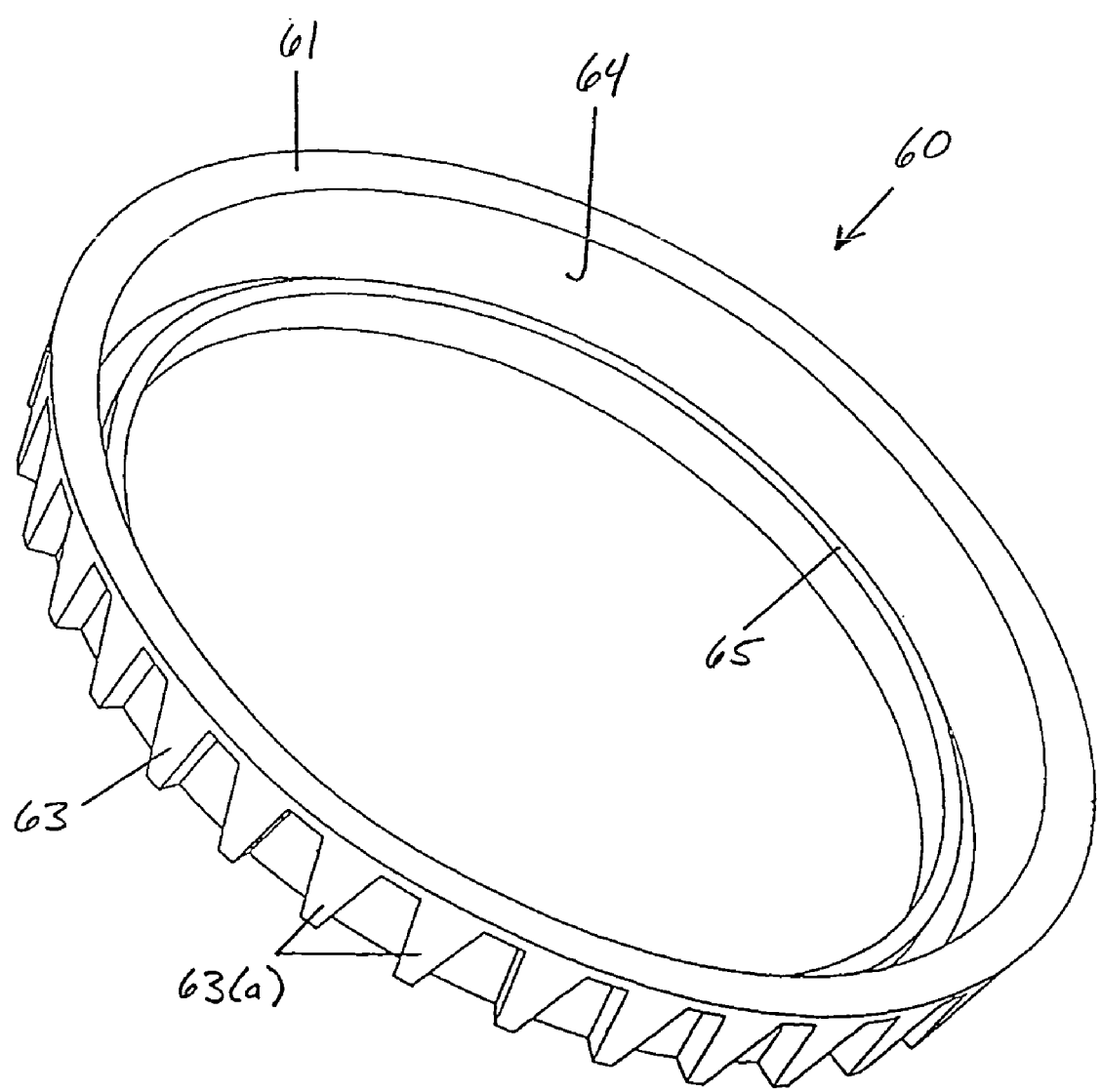
Figure 11:
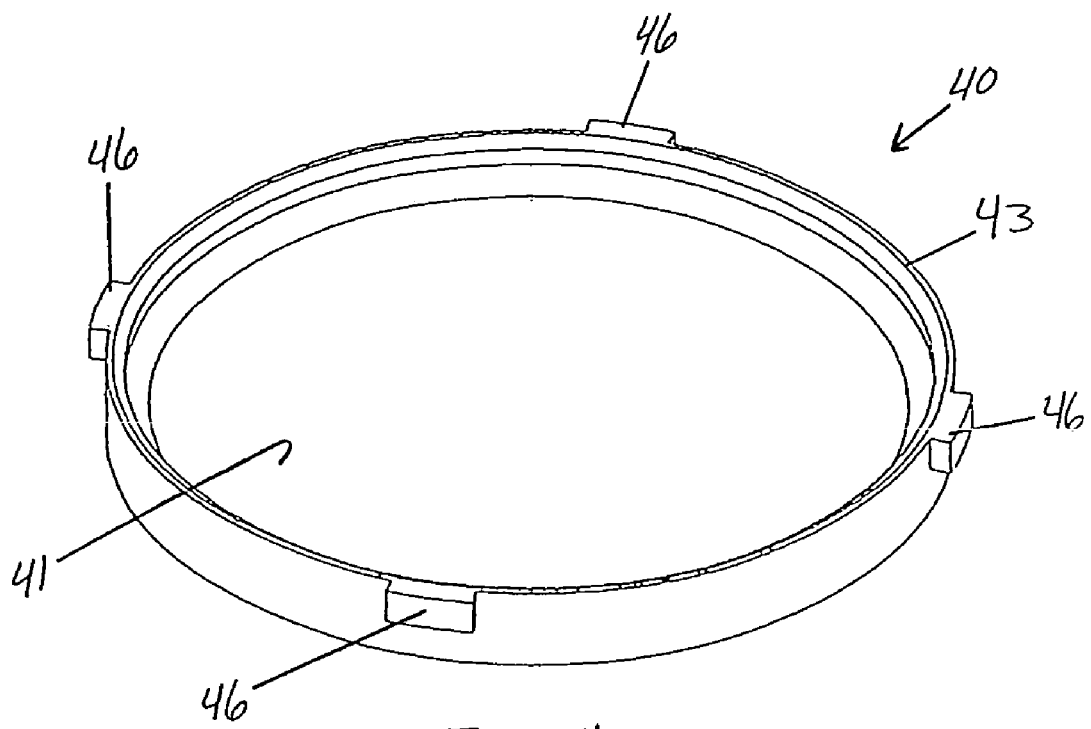
Figure 12:
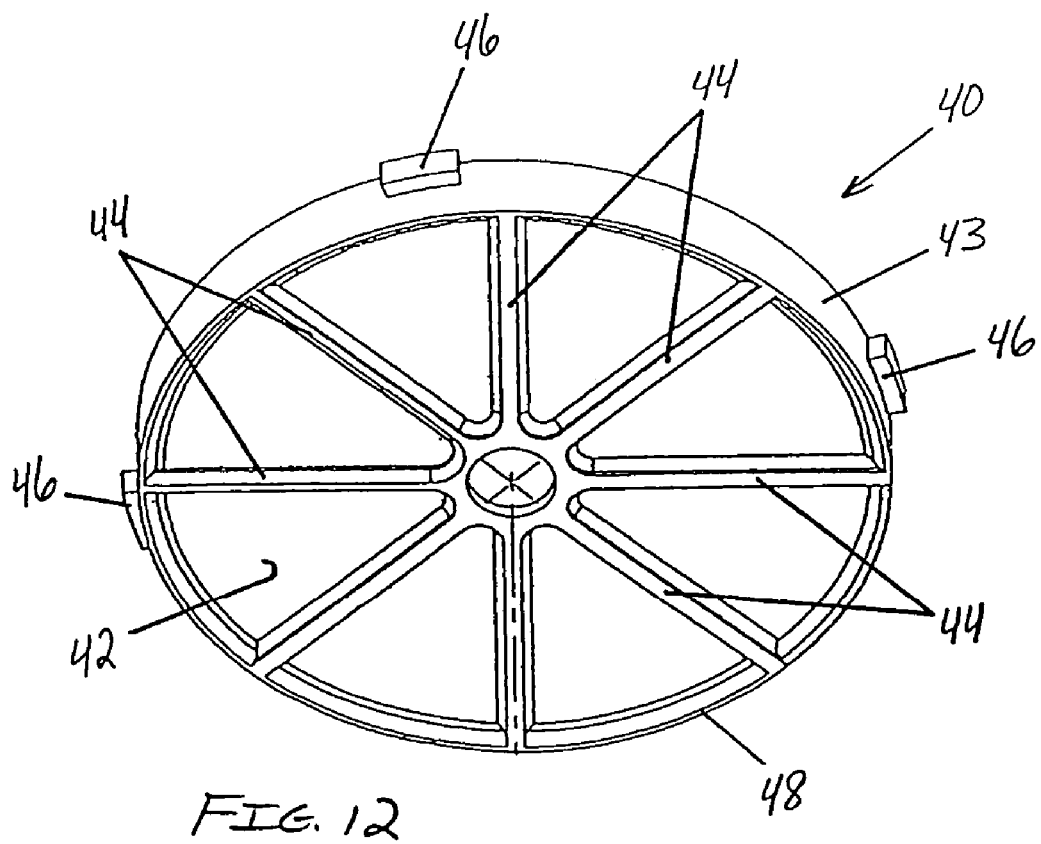
Figure 13:
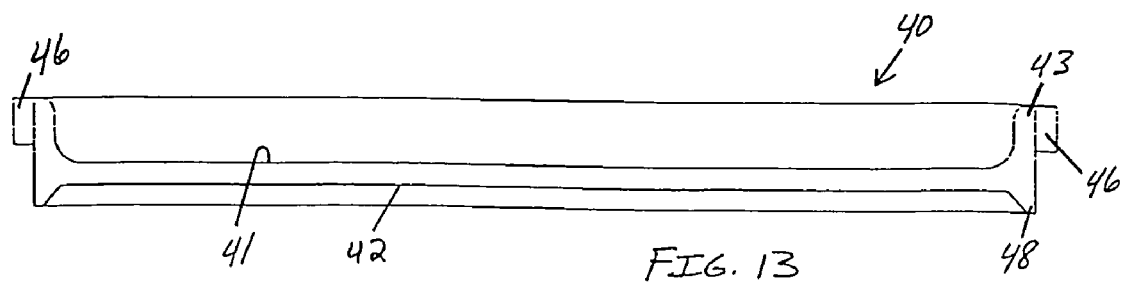
Figure 14:
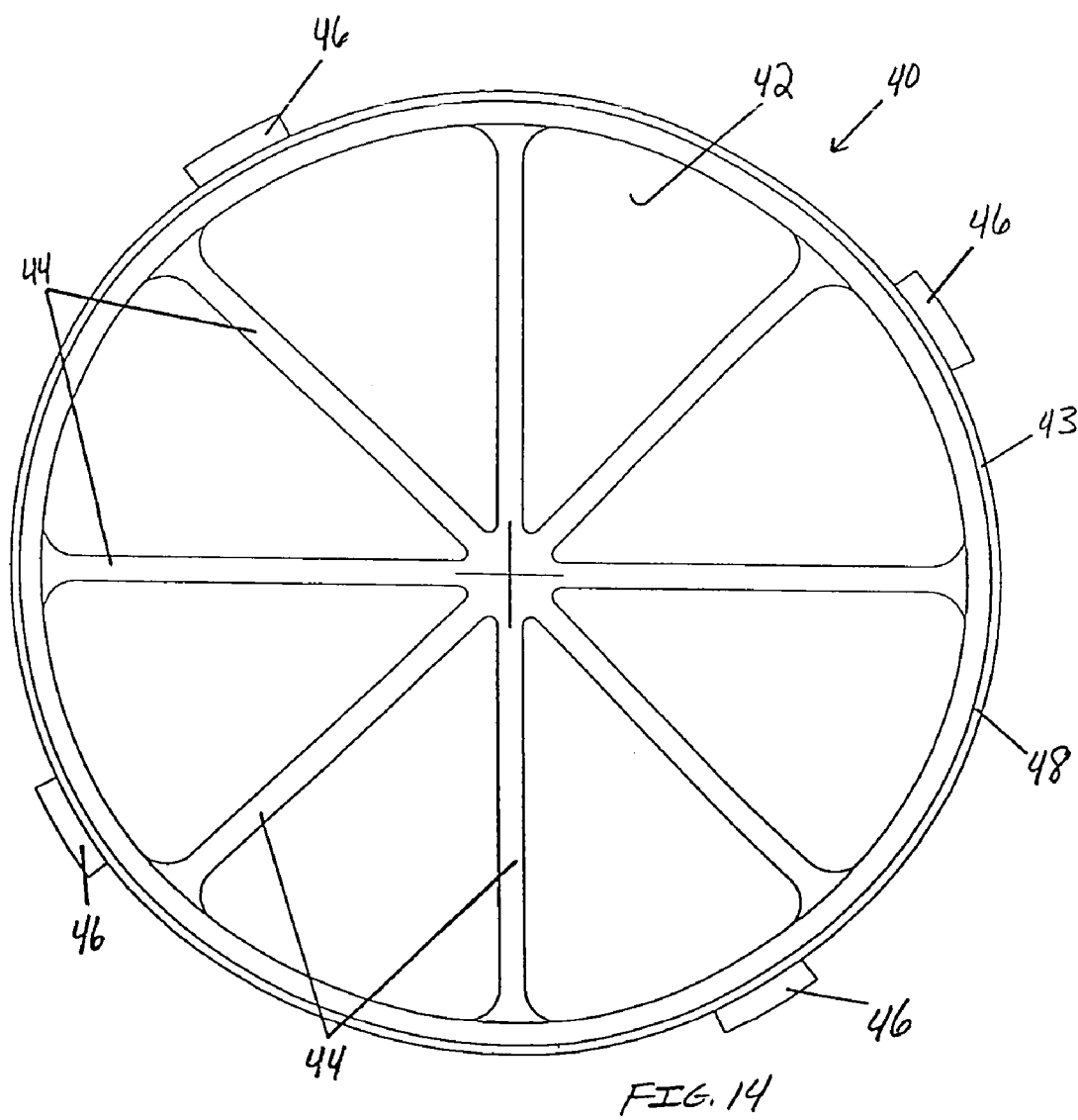
Figure 15:
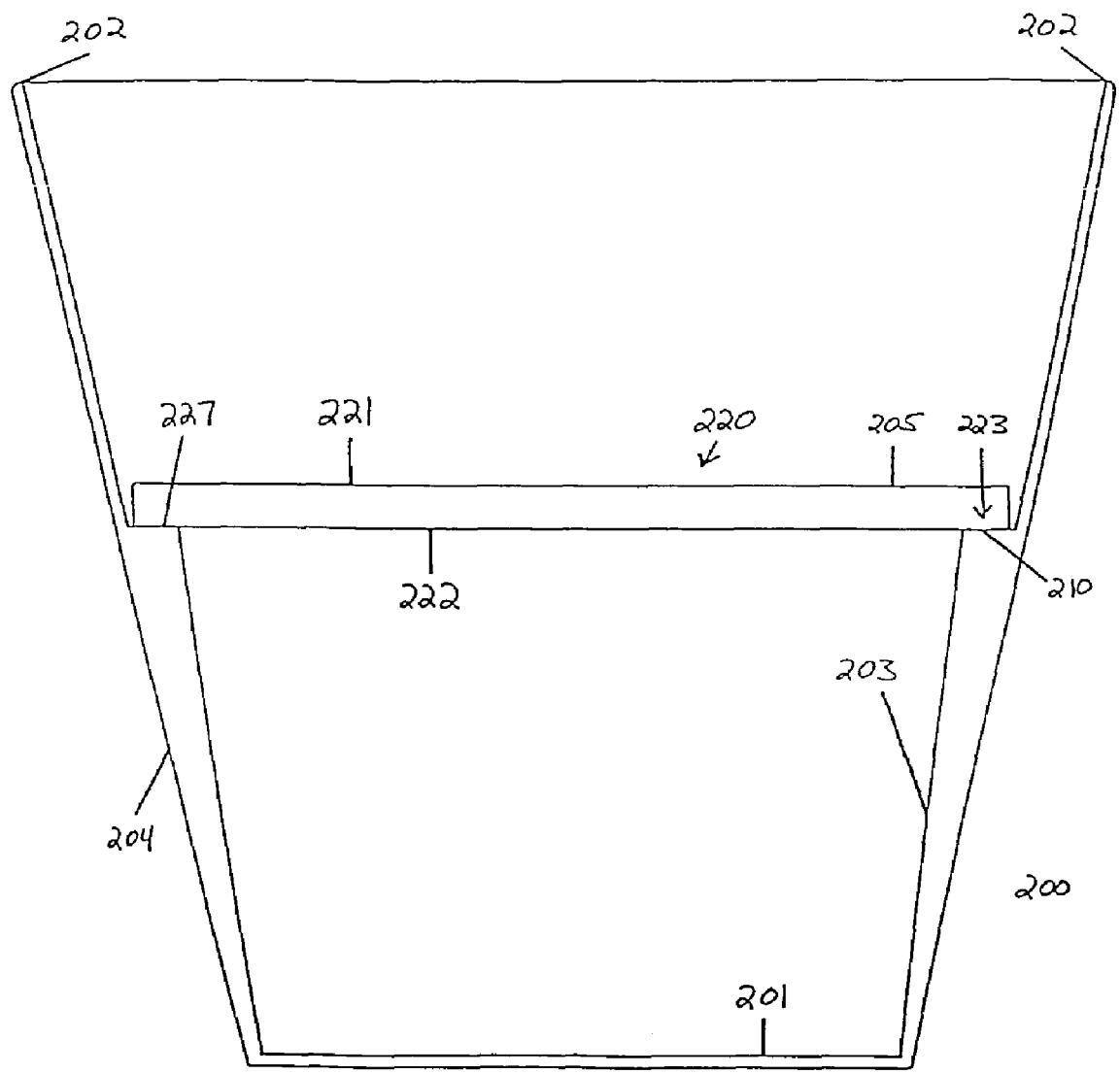
Figure 16:
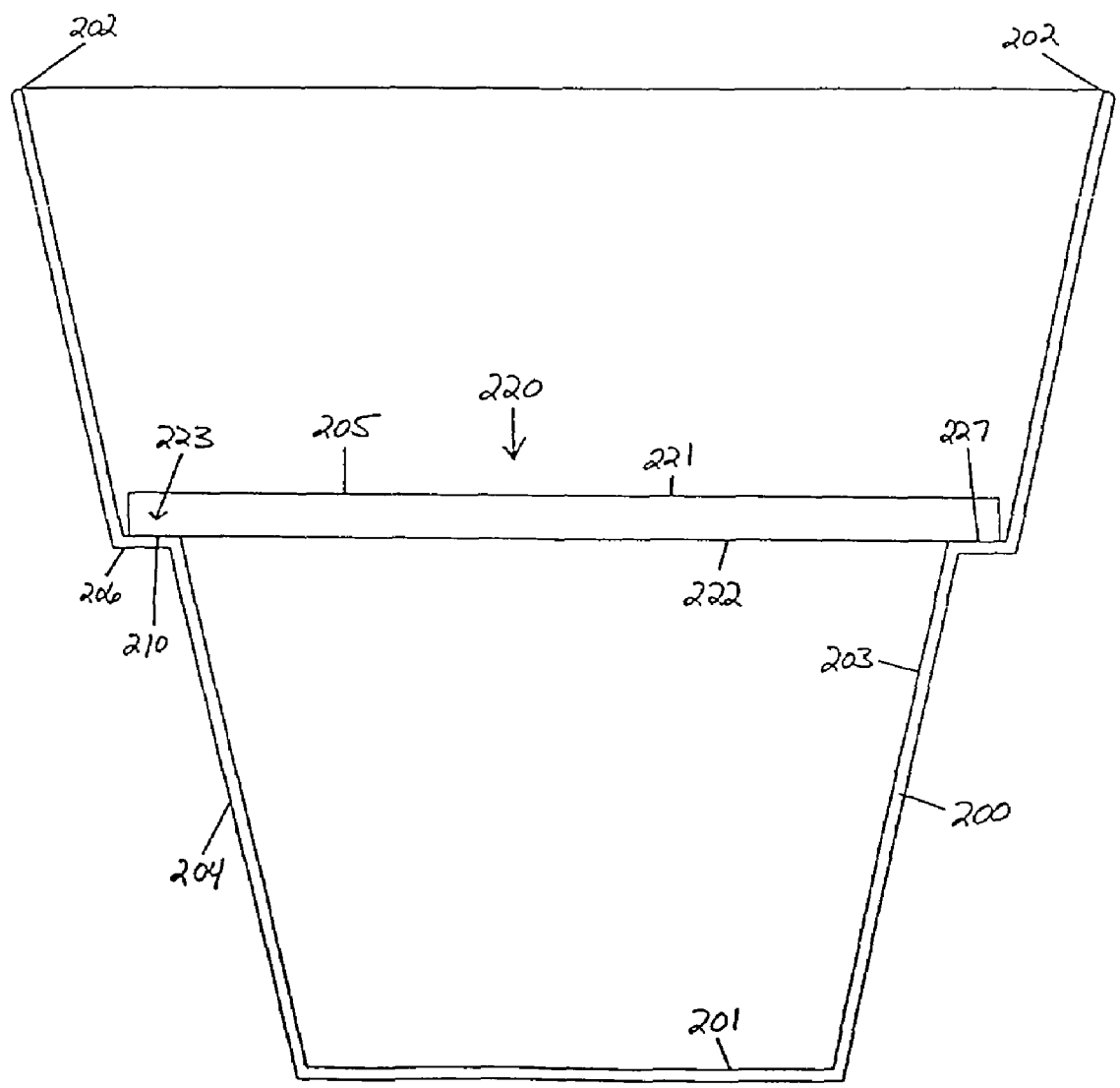
Figure 19:
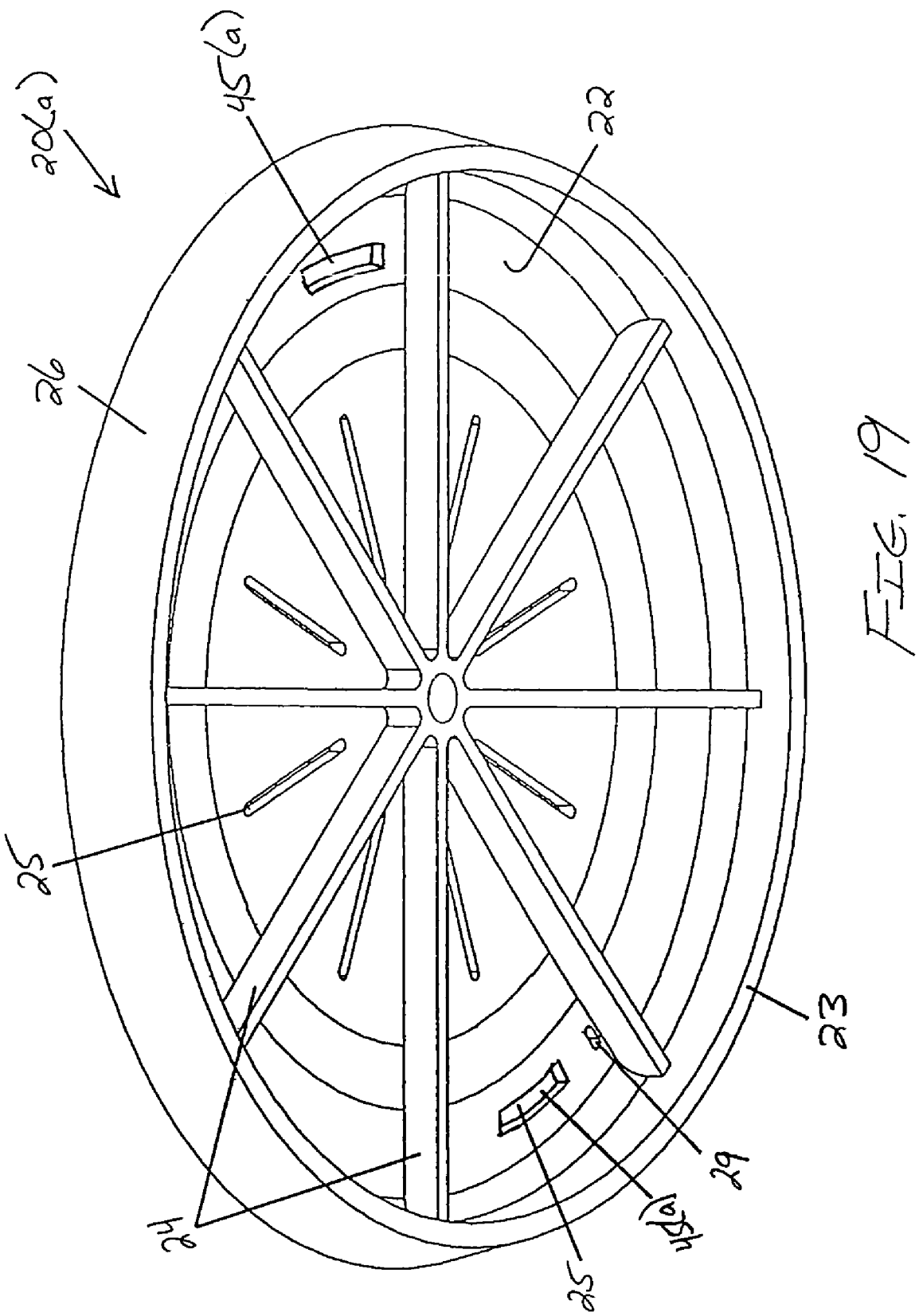
Figure 20:
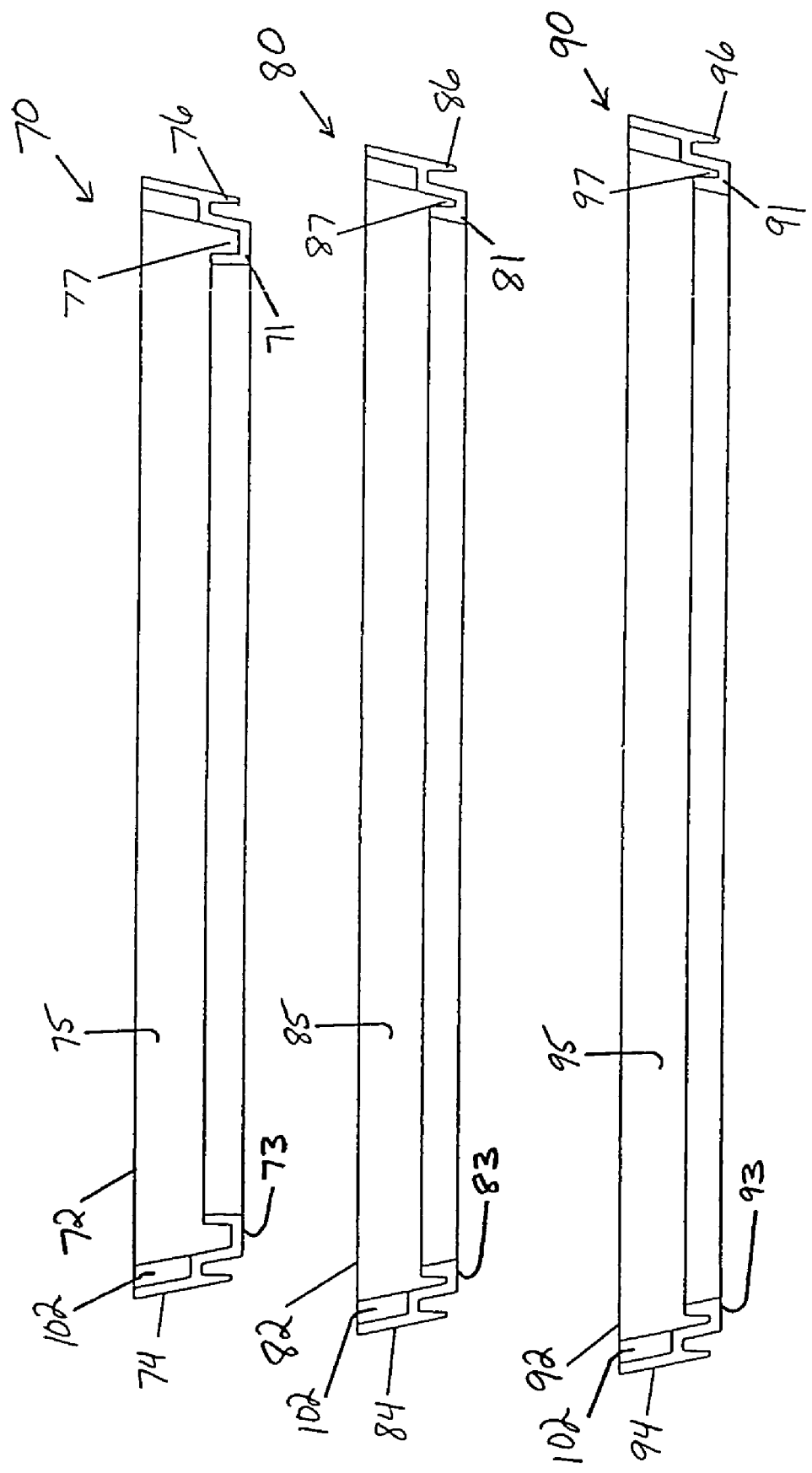
Figure 21A:
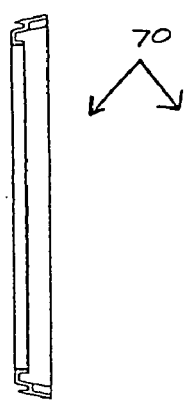
Figure 21B:
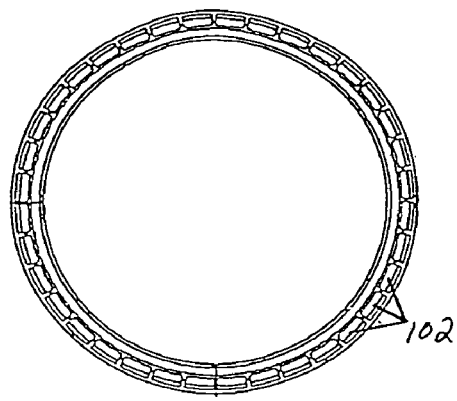
Figure 22A:
Figure 22B:
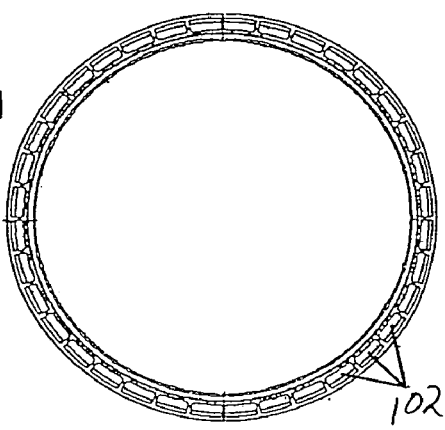
Figure 23A:
Figure 23B:
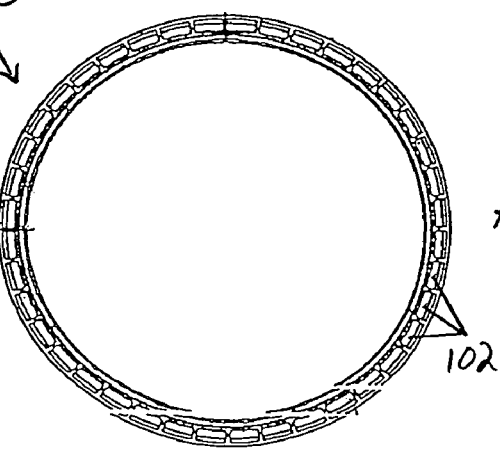
Figure 24:
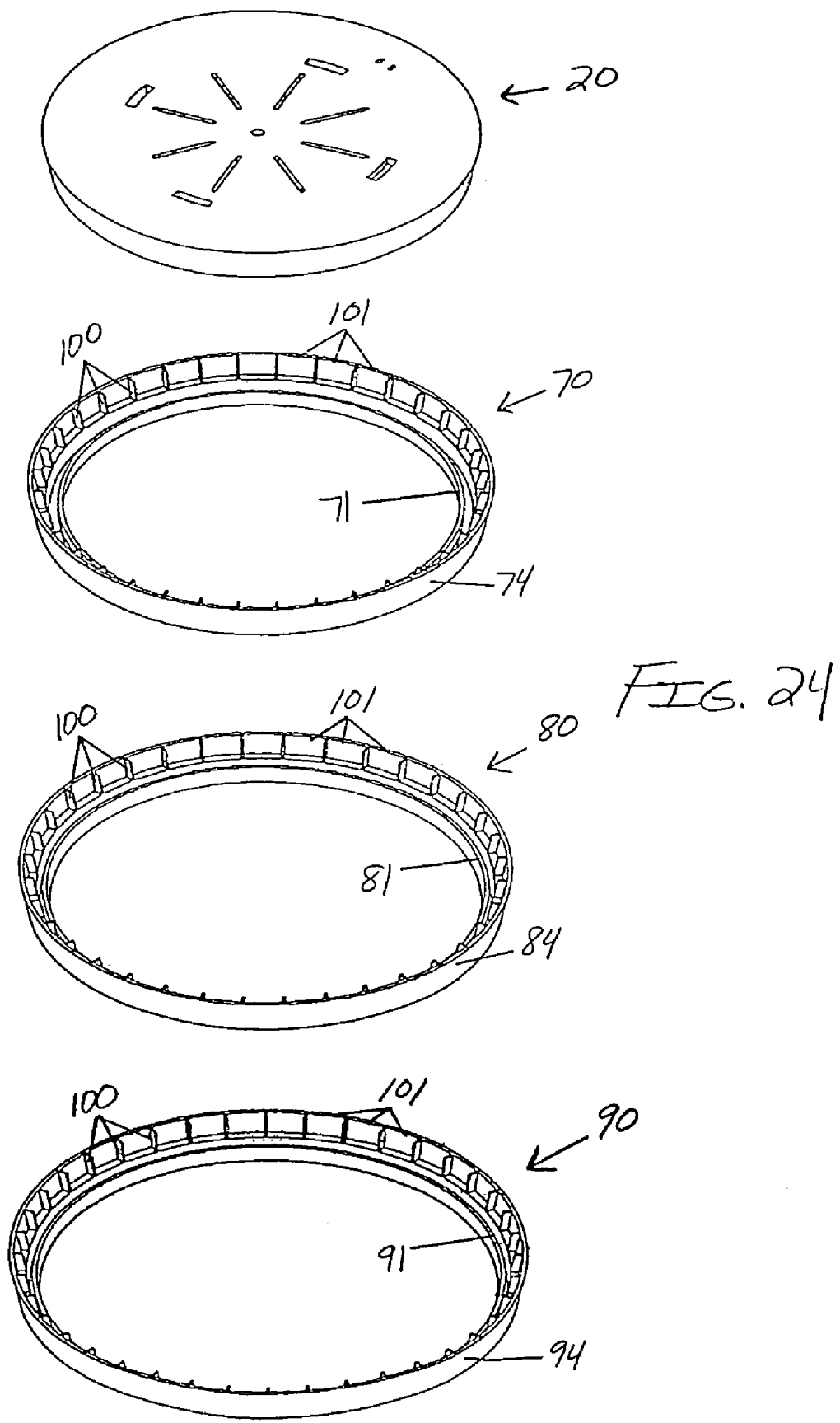
Figure 25:
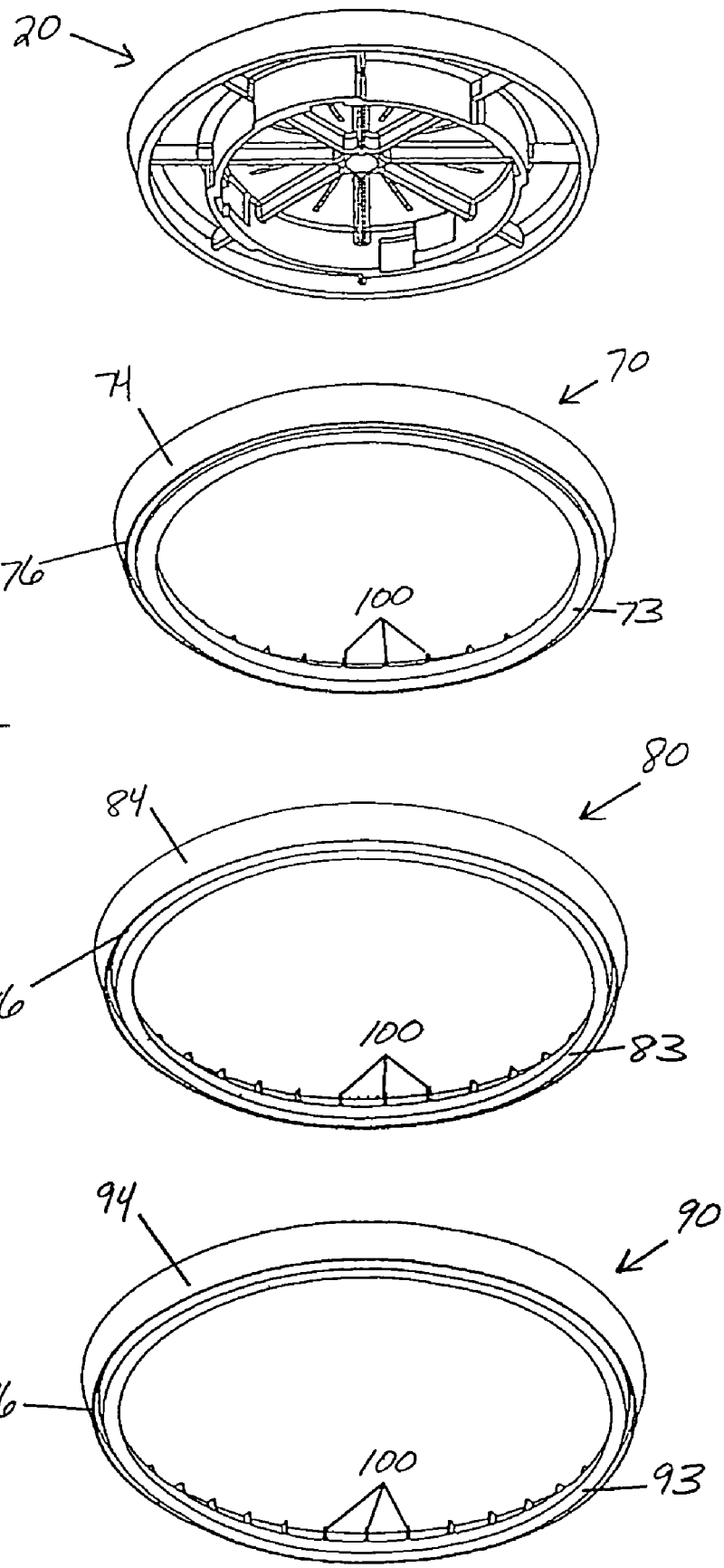
Figure 26:
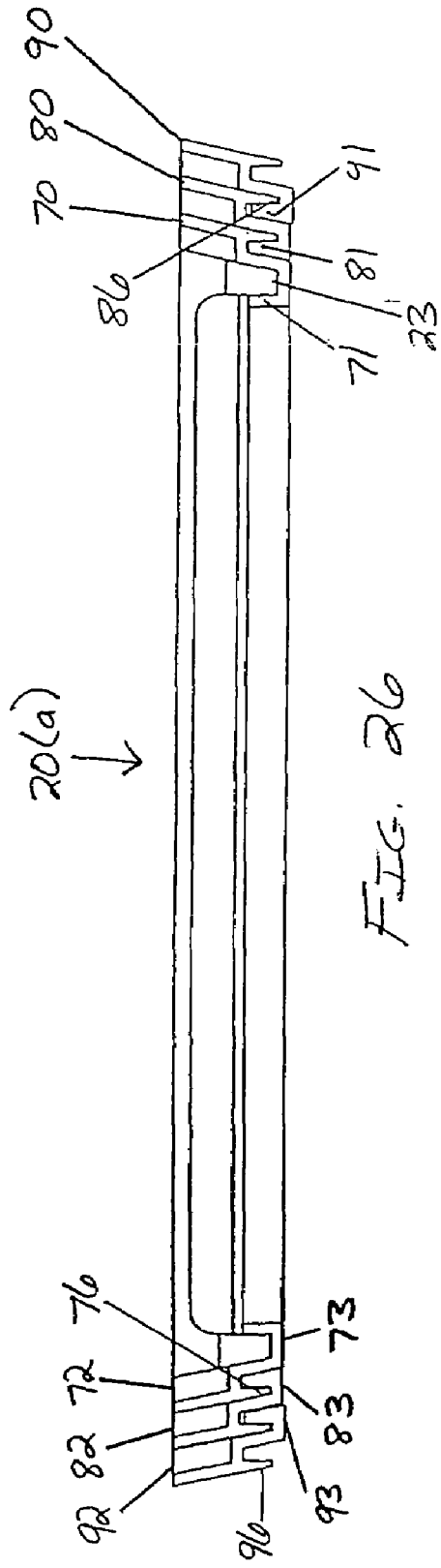
Figure 27:
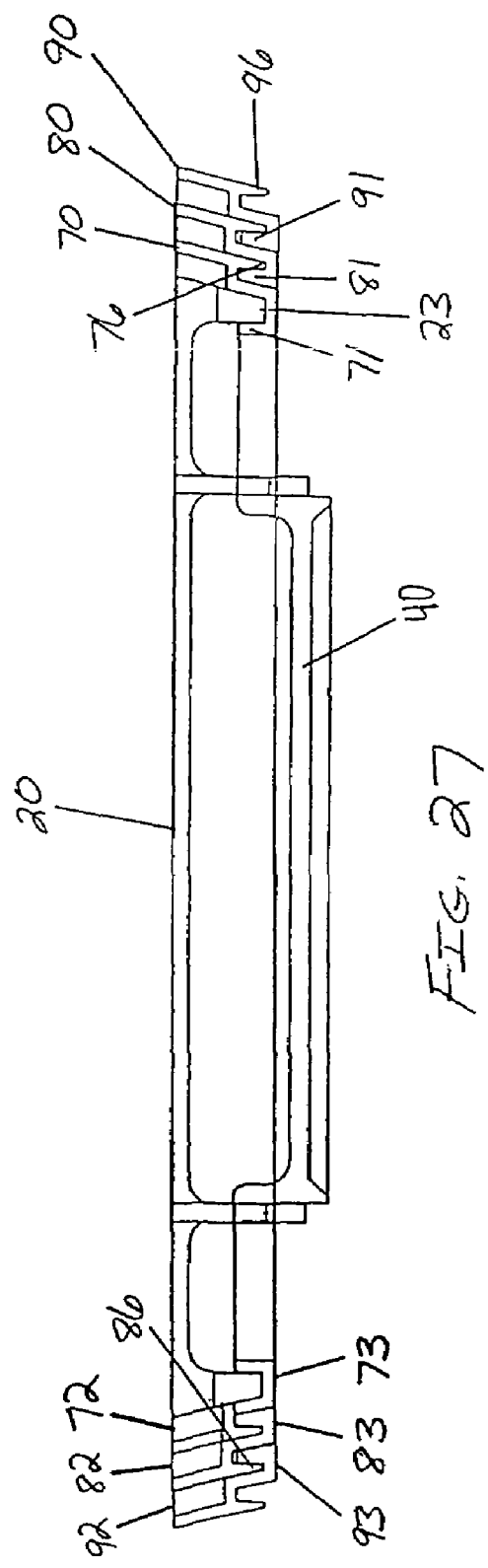

Figure No. 2 is an exploded top perspective view of an alternative embodiment of the false bottom insert assembly.

Figure No. 3 is an exploded bottom perspective view of the false bottom insert assembly as shown in Figure No. 2.

Figure No. 4 top plan view of the preferred soil support platform.

Figure No. 4(a) is a cross sectional view side view of one latch member-receiving notch of the soil support platform as shown in Figure No. 4.

Figure No. 5 is a cross sectional side view of the soil support platform as shown in Figure No. 4.

Figure No. 6 is a bottom plan view of the soil support platform as shown in Figure No. 4.

Figure No. 7 is a cross sectional side view of the preferred moisture-receiving tray attached to the preferred soil support platform.

Figure No. 8 is a cross sectional side view of the support spacer member of an alternative embodiment of the false bottom insert assembly.

Figure No. 9 is a bottom plan view of the support spacer member shown in Figure No. 8.

Figure No. 10 is a top perspective view of the support spacer member shown in Figure No. 8.

Figure No. 11 is a top perspective view of the moisture-receiving tray of the preferred embodiment of the false bottom insert assembly.

Figure No. 12 is a bottom perspective view of the moisture-receiving tray shown in Figure No. 11.

Figure No. 13 is a cross sectional side view of the moisture-receiving tray shown in Figure No. 11.

Figure No. 14 is a bottom plan view of the moisture-receiving tray shown in Figure No. No. 11.

Figure No. 15 is a cross sectional side view of an alternative embodiment of soil support platform inserted in a first alternative planter container.

Figure No. 16 is a cross sectional side view of the soil support platform shown in Figure No. 15 inserted in a second alternative planter container.

Figure No. 17(a) is a perspective view of the soil support platform shown in Figure No. 4 with a tie strap looped through tie strap-receiving apertures in a lowered position.

Figure No. 17(b) is a perspective view of the soil support platform shown in Figure No. 17(a) with the tie strap shown in an elevated position.

Figure No. 18 is a top perspective view of an alternative soil support platform.

Figure No. 19 is a bottom perspective view of the soil support platform shown in Figure No. 18.

Figure No. 20 is a cross sectional exploded side view of first, second, and third alternative nestable support spacer members.

Figure No. 21(a) is a cross sectional side view of the first alternative nestable support spacer member shown in Figure No. 20.

Figure No. 21(b) is a top plan view of the first alternative nestable support spacer member shown in Figure No. 21(a).

Figure No. 22(a) is a cross sectional side view of the second alternative nestable support spacer members shown in Figure No. 20.

Figure No. 22(b) is a top plan view of the second alternative nestable support spacer member shown in Figure No. 22(a).

Figure No. 23(a) is a cross sectional side view of the third alternative nestable support spacer member shown in Figure No. 20.

Figure No. 23(b) is a top plan view of the third alternative nestable support spacer member shown in Figure No. 23(a).

Figure No. 24 is an exploded top perspective view of an alternative embodiment of the false bottom insert assembly.

Figure No. 25 is an exploded bottom perspective view of the alternative embodiment of the false bottom insert assembly shown in Figure No. 24.

Figure No. 26 is a cross sectional side view of the alternative embodiment of the false bottom insert assembly shown in Figure No. 24 in an assemble state.

Figure No. 27 is a cross sectional side view of an alternative embodiment of the false bottom insert assembly.

DETAILED DESCRIPTION OF THE PREFERRED EMBODIMENT

Referring now to the drawings, the preferred embodiment of the present invention concerns a container insert or insert assembly 10 as generally illustrated in an assembled state in Figure No. 1. As can be seen from an inspection of Figure No. 1, insert assembly 10 is designed for use in combination with an oversized planter pot or oversized planter container 100 and creates a false bottom 105 in the same. Planter container 100 is further illustrated in Figure Nos. 2 and 3. As earlier described, false bottom 105 is primarily designed to make more efficient use of soil. In this regard, it is contemplated that false bottom 105 enables the user to place lesser, more plant specific, amounts of soil 107 into planter containers such as planter container 100. In other words, plants do not necessarily require the maximum soil depth as attainable in an oversize planter container and thus only require superficial amounts of soil adjacent the rim of planter container 100 as is generally shown in Figure No. 1.

By thus providing false bottom 105, the present invention cuts down on soil use as well as container mass, thus saving added soil cost and manual effort to transport a given planter container. It is contemplated that users of large planter containers having at least a 16-inch diameter circular opening at the mouth or upper rim of the planter container may benefit the most from use of insert assembly 10. In this last regard, it is contemplated that a planter container having at least a 16-inch diameter circular opening at the mouth or upper rim of the container may be characterized as an oversized planter container. Though it is noted that some plants may comprise root systems that utilize the maximum soil depth of an oversize planter container, the user may elect to place plants having root systems requiring minimal soil depth in an oversized planter container for aesthetic or other reasons and thus false bottom 105 effectively reduces soil quantity needs. It is contemplated that a planter container having the noted minimal specifications can often be quite unwieldy when filled to capacity with soil and/or other fill materials and it is for this reason that a 16-inch diameter planter container is here specified as being representative of the smaller sized of the oversized planter containers.

It should be further noted that the present invention might be easily adapted for use with planter containers having lateral cross sectional shapes other than those of circular configuration. For example, planter containers having rectangular shaped lateral cross sections are common as are planter containers having more specifically square shaped lateral cross sections. As illustrated in Figure Nos. 1, 2, and 3, planter container 100 may be envisioned having a circular lateral cross section. For purposes of descriptive brevity, planter container 100 has been illustrated as being representative of planter containers in general. The reader should thus bear in mind that insert assembly 10 might be easily adapted for use with planter containers having varied shapes and sizes.

Planter container 100 may be constructed from any suitable planter container material. Preferably, however, planter container 100 comprises a container bottom 101 as illustrated in Figure Nos. 1 and 3; a container rim 102 as illustrated in Figure Nos. 1 and 2; and a substantially uniform sloped inner container surface 103 as illustrated in Figure Nos. 1 and 2. Optionally, planter container 100 may further comprise a drain aperture 110 in container bottom 101 as illustrated in Figure No. 3. It will be seen from a further inspection of Figure No. 1, that in the preferred embodiment of the present invention, inner container surface 103 is sloped such that the angle of inclination from vertical is uniformly in the range of about 12°-15°. It will be further noted that inner container surface 103 preferably extends uniformly from container bottom 101 to container rim 102. Intermediate container bottom 101 and container rim 102 is a select container periphery 104 as referenced in Figure No. 1. Select container periphery 104 represents that region of planter container 100 where insert assembly 10 creates false bottom 105. As can be seem from a general consideration of Figure No. 1, false bottom 105 significantly reduces the quantity of soil 107 needed to maintain plant life or a plant 106 in a viable state. As earlier described, the root system 106(a) of a plant 106 may not require a soil depth as great in magnitude as that of the depth of planter container 100. As illustrated in Figure No. 1, root system 106(a) has sufficient soil depth with which to maintain plant 106 in viable state. It will thus be understood that false bottom 105 successfully fulfills its function of making more efficient use of soil 107.

In the preferred embodiment, insert assembly 10 preferably comprises a container insert or soil support platform 20 as illustrated in Figure Nos. 1-4, 5-7, 17(a), 17(b), 24, 25, and 27; and an optional moisture-receiving tray 40 as illustrated in Figure Nos. 1-3, 7, 11-14, and 27. Soil support platform 20 is preferably constructed of reground polystyrene, but may also be constructed from polyethylene, polypropylene, or other similar materials. Soil support platform 20 preferably comprises a substantially planar superior support surface 21 as illustrated in Figure Nos. 1, 2, 4, 5, 7, 17(a), and 17(b); a substantially planar inferior support surface 22 as illustrated in Figure No. 5; a peripheral support ridge 23 as illustrated in Figure Nos. 1, 3, 5, and 7; a plurality of support ribs 24 as illustrated in Figure Nos. 3 and 6; and a plurality of matter-receiving apertures 25 four of which are referenced in Figure No. 2; three types of which are further illustrated in Figure Nos. 4 and 6; and three types of which are referenced in Figure No. 17(b).

Peripheral support ridge 23 preferably comprises a sloped peripheral support surface 26 as referenced in Figure Nos. 1, 2, 3, 5, 7, 17(a), and 17(b); and a peripheral support rim 27 as referenced in Figure Nos. 1, 3, 5, 6, and 7. As can be seen from an inspection of the noted figures, peripheral support surface 26 is that portion of peripheral support ridge 23 that extends intermediate superior support surface 21 and peripheral support rim 27 and in the preferred embodiment has a container-engaging depth. From an inspection of Figure No. 1, it will be seen that the peripheral support surface 26 engages inner container surface 103 at select container periphery 104. Preferably, peripheral support surface 26 has a uniform sloped angle of inclination from vertical ranging from about 12°-15° to match the angle of inclination of inner container surface 103. Thus when soil support platform 20 is inserted into planter container 100, peripheral support surface 26 snugly wedges soil support platform 20 in place under its own weight. It will thus be seen that peripheral support surface 26 is in removably wedged engagement with select container periphery 104 and that the container insert or soil support platform 20 thus forms false bottom 105 in the oversized planter container 100 at select container periphery 104.

Preferably select container periphery 104 is a substantially uniform measured distance from container rim 102, the preferred measured distance ranging from about 6 to 8 inches. By so providing, false bottom 105 may yield a soil depth of about 6 to 8 inches, which depth provides most types of plant life with sufficient life sustaining soil. It is appreciated, however, that the end user may desire various soil depths as well as various types of planter containers having varied angles of inclination from vertical. Soil support platform 20 may thus be manufactured in various sizes with sloped peripheral support surfaces of varying degrees to accommodate the various desires of end users. Given a planter container having a circular horizontal cross section and a 16-inch inner diameter at the container rim and having a sloped inner container surface having an angle of inclination from vertical of about 12°-15°, it is contemplated that a soil support platform as described having a 12-inch diameter at the superior support surface will form a false bottom in the given planter container about 6-8 inches from the container rim. It is further contemplated that given an inner container surface having an angle of inclination from vertical of about 12°-15°, an increase in diameter of a circular soil support platform 20 of about ¾ inch will result in a false bottom 105 that is raised approximately 2-3 inches. In other words, if a soil support platform having a 12-inch diameter were replaced with a soil support platform having a 12¾-inch diameter, the effective false bottom would be raised from about 6-8 inches below the container rim to about 3-6 inches from the container rim.

It will be understood that by placing soil 107 and plant 106 or other matter atop soil support platform 20, soil support platform 20 is more fixedly wedged in place at select container periphery 104. Reground polystyrene is thus the preferred load bearing material for soil support platform 20 insofar as it has relatively low cost, yet has sufficient rigidity to withstand the various forces acting upon soil support platform 20 both under its own weight and additionally when matter is supported by it.

To improve the support characteristics of soil support platform 20, however, support ribs 24 are integrally formed to inferior support surface 22 and are substantially equally spaced from one another. As can be seen from an inspection of Figure No. 6, support ribs 24 are radially aligned from a center portion on inferior support surface 22. Given the circular horizontal cross section of soil support platform 20, support ribs 24 may comprise a peripheral support rib, the peripheral support rib being concentric within peripheral support ridge 23 and connecting the radially aligned support ribs 24. It is noted that given a differently shaped soil support platform, the arrangement of support ribs 24 may vary. For example, if a square shaped horizontal cross section of the soil support platform is desired, support ribs 24 may be aligned in a grid or a joist like pattern. Support ribs 24 provide soil support platform 20 with additional load bearing structure to withstand the various forces acting upon soil support platform 20 at any given point in time.

Inferior support surface 22 preferably further comprises a tray support structure 31 as illustrated in Figure Nos. 1, 3, 5, 6, and 7. Tray support structure 31 is concentric within peripheral support ridge 23 and has a tray support depth substantially equal in magnitude to the container-engaging depth of peripheral support surface 26. Tray support structure 31 comprises tray-supporting means described in more detail below.

Matter-receiving apertures 25 may preferably be spaced intermediate support ribs 24 as generally illustrated in Figure No. 6 and extend from superior support surface 21 to inferior support surface 22. Matter-receiving apertures 25 may preferably be defined by at least one moisture drain aperture 28 as further illustrated in Figure Nos. 2, 4, and 6. Additionally, matter-receiving apertures 25 may be further defined by at least two tie strap-receiving apertures 29 as illustrated in Figure No. 4. In this last regard, it is contemplated that insert assembly 10 further comprise manual removal means for enabling a user to manually remove soil support platform 20 from engagement with inner container surface 103. In this regard, the manual removal means are preferably defined by a tie strap 30 as generally illustrated in Figure Nos. 17(a) and 17(b). The user may feed tie strap 30 through adjacent tie strap-receiving apertures 29 and loop the tie strap ends together. For purposes of clarity, a free-floating looped tie strap 30 is illustrated adjacent soil support platform 20 as illustrated in Figure No. 17(a). Excellent results have been achieved using the described tie strap structures. Tie straps are inexpensive and provide a highly effective means for enabling a user to manually remove soil support platform 20 from engagement with inner container surface 103. Tie strap 30 may be pulled to or positioned in a superior or elevated position and a user's fingers may operate to lift soil support platform 20 from engagement with inner container surface 103 as generally depicted in Figure No. 17(b). Before placing soil 107 or other materials atop soil support platform 20, tie strap 30 may be pushed to or positioned in an inferior position so as to help eliminate the possibility of root system entanglement therewith as generally depicted in Figure No. 17(a).

Optionally, insert assembly 10 further comprises moisture-receiving tray 40 for collecting moisture that may drain from moisture drain aperture(s) 28. It should be noted that moisture-receiving tray 40 not only functions to collect moisture from moisture drain aperture(s) 28 and other matter-receiving apertures 25, but also retains moisture in an elevated position relative to container bottom 101. It is contemplated that various root systems, and thus the plant, may fare better provided with a constant source of moisture. Moisture-receiving tray 40 thus serves the function of collecting and retaining moisture in inferior adjacency to false bottom 105 so as to provide evaporative moisture to soil 107 as desired by the user. Should the user decide not to install moisture-receiving tray 40 for whatever reason, the user may simply keep moisture-receiving tray 40 in storage or remove moisture-receiving tray 40 from attachment to soil support platform as hereinafter described.

Moisture-receiving tray 40 preferably comprises a superior moisture-collecting tray surface 41 as illustrated in Figure Nos. 1, 2, 7, 11, and 13; an inferior tray surface 42 as illustrated in Figure Nos. 1, 3, 7, 12, 13, and 14; a peripheral tray surface or rim 43 as referenced in Figure Nos. 2, 3, and 11-14; and a plurality of tray ribs 44 as illustrated in Figure Nos. 3, 12, and 14. Moisture-receiving tray 40 has preferable moisture-collecting depth ranging from about 0.6 inches to at most about 1.5 inches. It is contemplated that moisture-collecting depth greater in magnitude than 1.5 inches may hold too great an amount of moisture, which may tend to decrease the effectiveness of insert assembly 10.

Notably, peripheral tray rim 43 comprises insert attachment means for removably attaching moisture-receiving tray 40 to soil support platform 20. The earlier noted tray-supporting means are preferably defined by at least two, but preferably four, latch member-receiving notches 45 as illustrated in Figure Nos. 2, 4, 4(a), and 6; and the insert attachment means are preferably defined by at least two, but preferably four, tray support latch members 46 as illustrated in Figure Nos. 2, 3, and 11-14. Latch member-receiving notches 45 are formed in tray support structure 31 such that tray support structure 31 further comprises tray support lips 47 as illustrated in Figure No. 4(a) and 7. Tray support latch members 46 are thus removably insertable into the latch member-receiving notches 45 and supportable on tray support lips 47 for removably attaching moisture-receiving tray 40 to the container insert or soil support platform 20. Moisture-receiving tray 40 in preferably structured such that peripheral tray surface 43 is concentrically adjacent within tray support structure 31 when moisture-receiving tray 40 is removably attached to soil support platform 20.

Similar to support ribs 24, tray ribs 44 are integrally formed to inferior tray surface 42 and are substantially equally spaced from one another. As can be seen from an inspection of Figure Nos. 12 and 14, tray ribs 44 are radially aligned from a center portion on inferior tray surface 42. Given the circular horizontal cross section of soil support platform 20 and moisture-receiving tray 40, tray ribs 44 may comprise a peripheral tray rib 48 as referenced in Figure Nos. 1, 3, 7, and 12-14, the peripheral tray rib connecting the radially-aligned tray ribs 44. It is noted that given a differently shaped soil support platform 20 and moisture-receiving tray 40, the arrangement of tray ribs 44 may vary. For example, if a square shaped horizontal cross section of the soil support platform and moisture-receiving tray is desired, the tray ribs may be aligned in a grid or a joist like pattern. Tray ribs 44 thus provide moisture-receiving tray 40 with additional load bearing structure to withstand the various forces acting upon moisture-receiving tray 40 at any given point in time.

Alternative Embodiment No. 1

A first alternative embodiment of the present invention concerns a container insert or insert assembly that is substantially identical to the preferred embodiment of the present invention except for several structures. The soil support platform of the first alternative embodiment comprises a container insert or soil support platform and an optional moisture-receiving tray. The first alternative embodiment of the soil support platform is also preferably constructed of reground polystyrene and preferably comprises substantially planar superior support surface 21 as illustrated in Figure No. 18; substantially planar inferior support surface 22 as illustrated in Figure No. 19; peripheral support ridge 23 as illustrated in Figure No. 19; a plurality of support ribs 24 as illustrated in Figure No. 19; and a plurality of matter-receiving apertures 25 as illustrated in Figure Nos. 18 and 19. Unlike the preferred embodiment of soil support platform 20, however, inferior support surface 22 omits tray support structure 31 as can be generally seen by comparing Figure Nos. 3 and 6 (with tray support structure 31) with Figure Nos. 19 and 26 (without tray support structure). In this regard, the alternative soil support platform is referenced by 20(a) in Figure Nos. 18, 19, and 26.

It is contemplated that inferior support surface 22 may comprise a peripheral support rib, the peripheral support rib being concentric within peripheral support ridge 23 and connecting the radially or otherwise aligned support ribs 24. Further, matter-receiving apertures 25 are defined by at least two, but preferably four, latch member-receiving apertures as generally referenced at the superior openings of notches 45 in Figure Nos. 2 and 4, and as specifically illustrated in Figure Nos. 17(a), 17(b), 18, and 19 being referenced by 45(a). In Alternative Embodiment No. 1, latch member-receiving apertures 45(a) are medially adjacent to the peripheral support rib or medially adjacent peripheral support ridge 23 as generally depicted in Figure No. 19. It is contemplated that the insert attachment means of the moisture-receiving tray are defined by comprising at least two, but preferably four, tray support latch members (not illustrated). It is thus contemplated that the tray support latch members are removably insertable through the latch member-receiving apertures 45(a) for removably attaching the moisture-receiving tray to the soil support platform. The peripheral tray rim of the moisture-receiving tray is thus concentric within the peripheral support rib or peripheral support ridge when the moisture-receiving tray is removably attached to the soil support platform. The first alternative embodiment of the present invention thus provides the manufacturer with means to avoid having to construct tray support structure 31 with latch member-receiving notches 45. Instead, latch member-receiving apertures 45(a) directly extend from superior support surface 21 to inferior support surface 22.

Further, the first alternative embodiment of the present invention provides the manufacturer with means to avoid having to construct moisture-receiving tray 40 with tray support latch members 46. Alternatively, by adding support latch members to the superior rim surface of the moisture-receiving tray 40 and by simply providing latch member-receiving apertures 45(a) in the soil support platform for receiving the support latch members, an alternative means for removably attaching the moisture-receiving tray to the soil support platform is provided.

Alternative Embodiment No. 2

A second alternative embodiment of the present invention concerns an insert assembly that is substantially identical to the preferred embodiment of the present invention except for inclusion of an additional key component. In the second alternative embodiment of the present invention, the insert assembly comprises soil support platform 20 as earlier described, optional moisture-receiving tray 40 as earlier described, and, in addition, at least one support spacer member 60 as generally illustrated in Figure Nos. 2, 3, 8-10. It is noted that planter containers have widely discrepant dimension specifications. In fact, dimension variance often exists even among individual planter containers within the same model grouping. With this fact in mind, it is contemplated that support spacer member 60 functions to serve as means for enabling users to more effectively position a false bottom at a select container periphery as well as means for enabling users to form a false bottom in planter containers having open mouth or inner container diameter dimensions that greatly exceed the dimensions of the superior support surface of the soil support platform.

Support spacer member 60 is also preferably constructed from reground polystyrene and is formed to preferably comprise a substantially planar superior spacer surface 61 as illustrated in Figure Nos. 2, 8, and 10; a substantially planar inferior spacer surface 62 as illustrated in Figure Nos. 3, 8, and 9; a sloped outer peripheral surface 63 as illustrated in Figure Nos. 8-10; a sloped inner peripheral surface 64 as illustrated in Figure Nos. 8 and 10; a horizontal spacer thickness, and a platform support ridge 65 as illustrated in Figure Nos. 8-10. It will be understood that superior spacer surface 61 is preferably substantially parallel with inferior spacer surface 62, and that inner peripheral surface 64 is concentric within the outer peripheral surface 63. It should be further understood that platform support ridge 65 is integrally formed to inner peripheral surface 64 and extends medially or in a medial direction from inferior spacer surface 62. Notably, inner peripheral surface 64 has a platform-engaging depth that coincides with the container-engaging depth of soil support platform 20 as comparatively shown in Figure Nos. 7 and 8. For purposes of the present alternative embodiment description, the container-engaging depth may perhaps more precisely be referred to as a spacer member-engaging depth since in Alternative Embodiment No. 2, soil support platform 20 directly engages support spacer member 60 and not container 100. When inserted into a planter container, outer peripheral surface 63 is in removably wedged engagement with the select container periphery substantially as earlier described with respect to the peripheral support surface 26 and the select container periphery. In this alternative embodiment, however, peripheral support surface 26, when inserted into support spacer member 60, is in removably wedged engagement with inner peripheral surface 64 and peripheral support rim 27 is in removably seated engagement with platform support ridge 65. As earlier noted, the spacer-engaging depth preferably coincides with the platform-engaging depth such that superior support surface 21 is substantially coplanar with superior spacer surface 61. Thus, it will be understood that soil support platform 20 and support spacer member 60 together form a substantially planar false bottom in the oversized planter container at the select container periphery.

In order to achieve a proper false bottom location at the select container periphery, which, as earlier specified, is preferably 6-8 inches from the container rim, the horizontal spacer thickness preferably has a magnitude ranging from 0.25 to 5 inches. Horizontal spacer thicknesses of varying magnitudes will allow the user to select from a variety of support spacer members 60 to achieve the desired false bottom location for a given oversized planter container. It is further contemplated, however, that given an inner container surface having an angle of inclination from vertical of about 12°-15°, an overall increase in diameter of a circular support spacer member 60 of about ¾ inch will result in a false bottom 105 that is raised approximately 2-3 inches. In other words, if a support spacer member having a 14-inch diameter were replaced with a support spacer member platform having a 14¾-inch diameter, the effective false bottom would be raised from about 6-8 inches below the container rim to about 3-6 inches from the container rim.

Optionally, support spacer member 60 may comprise a dentate or toothed outer peripheral surface 63(*a*) as generally illustrated in Figure Nos. 2, 3, and 10 to reduce the amount of material used in construction of support spacer member 60, thus further reducing manufacturing costs. Excellent results have been obtained using the dentate outer peripheral surface 63 as shown and described. Additionally, it is contemplated that outer peripheral surface may comprise a plurality of moisture-receiving apertures 66, three of which are referenced in Figure No. 9, to allow excess moisture to drain from the false bottom to the true container bottom adjacent the inner container surface.

Alternative Embodiment No. 3

A third alternative embodiment of the present invention concerns an insert assembly that is substantially identical to the first alternative embodiment of the present invention except for the addition of the support spacer member 60 component as described hereinabove. It will be understood that support spacer member 60 is a component that does not structurally interfere with the moisture-receiving tray and thus it is believed that no further description is necessary here as it is within the ordinary skill of those in the pertinent art to simply add together the components of the first alternative embodiment and the support spacer member as earlier described.

Alternative Embodiment No. 4

A fourth alternative embodiment of the present invention concerns a container insert or insert assembly for use in combination with a planter container 200 as illustrated in Figure No. 15. It will be seen from an inspection of Figure No. 15 that planter container 200 comprises a container bottom 201, a container rim 202, an outer container surface 204 and a non-uniform inner container surface 203. Similar to inner container surface 103, inner container surface 203 extends from container bottom 201 to container rim 202. However, inner container surface 203 comprises an inner container ledge 210 intermediate container bottom 201 and container rim 202 as further illustrated in Figure Nos. 15 and 16.

A container insert or a soil support platform 220 for creating a false bottom 205 in oversized planter container 200 may thus be rested upon inner container ledge 210. Soil support platform 220 preferably comprises a substantially planar superior support surface 221 as illustrated in Figure Nos. 15 and 16; a substantially planar inferior support surface 222 as illustrated in Figure Nos. 15 and 16; a peripheral ledge-engaging support as generally referenced in Figure Nos. 15 and 16 at 223; a plurality of support ribs (not shown); and a plurality of matter-receiving apertures (not shown). The peripheral ledge-engaging support preferably comprises a peripheral support rim 227 as illustrated in Figure Nos. 15 and 16, but, notably, does not comprise a peripheral support surface. In this regard, it should be noted that soil support platform 220 does not necessarily engage inner container surface 203 since soil support platform is supported by inner container ledge 210 at peripheral support rim 227.

For further load-bearing support, the support ribs of soil support platform 220 may be integrally formed to inferior support surface 222 and further may be substantially equally spaced from one another. Further, the matter-receiving apertures are preferably spaced intermediate the support ribs and extend from superior support surface 221 to inferior support surface 222 and may be defined substantially as earlier described.

It will thus be seen that the fourth alternative embodiment of the present invention contemplates a soil support platform that is virtually identical to soil support platform 20 of the preferred embodiment. It should again be noted, however, that the peripheral ledge-engaging support of soil support platform 220 does not necessarily require a sloped peripheral support surface. In the fourth embodiment of the present invention, soil support platform 220 rests upon inner container ledge 210 via peripheral support rim 227, the peripheral support rim being in removably seated engagement with inner container ledge 210. Container insert or soil support platform 220 thus forms false bottom 205 in oversized planter container 200 at inner container ledge 210.

It should be noted that other features such as the manual removal means are virtually identical as in the preferred embodiment since those components do not structurally interfere with the fourth embodiment as described. Further, moisture-receiving tray 40 may be utilized in combination with soil support platform 220 as it is contemplated that soil support platform 220 may comprise tray support structure 31 substantially as earlier described. Further, similar to the preferred embodiment, false bottom 205 is preferably spatially located a substantially uniform measured distance from container rim 202, the measured distance preferably ranging from about 6 to 8 inches for the reasons earlier stated. In this regard, it should be noted that inner container ledge is preferably located a certain measured distance from container rim. The vertical distance from superior support surface 221 to peripheral support rim 227 may be on the order of fractions of an inch and thus the measured distance from inner container ledge 210 to container rim is in the range of 6+-8+inches at the manufacturer's election.

Outer container surface 204 may either comprise a uniform outer container surface as generally illustrated in Figure No. 15 or a non-uniform outer container surface as generally illustrated in Figure No. 16. Given the non-uniform outer container surface, outer container surface 204 may optionally comprise an exterior container overhang 206 as illustrated in Figure No. 16. It is contemplated that container overhang 206 is laterally adjacent to and structurally coincides with inner container ledge 210. Container overhang 206 thus forms an exterior structural marker for identifying the approximate spatial location of inner container ledge 210. Further, container overhang 206 may serve additional functions; for example as means for enabling a user to more easily lift planter container 200 for transportation purposes.

Alternative Embodiment No. 5

A fifth alternative embodiment of the present invention concerns a container insert or insert assembly for use in combination with planter container 200 and as described under the heading, Alternative Embodiment No. 4. The fifth embodiment thus contemplates use of the moisture-receiving tray and associated structures as described with reference to Alternative Embodiment No. 1, but for use in combination with planter container 200. That is, unlike the preferred embodiment of soil support platform 20, inferior support surface 222 of the fifth alternative embodiment omits tray support structure 31. It is believed that one with ordinary skill in the pertinent art could easily combine the soil support platform and moisture-receiving tray notions as described under the heading Alternative Embodiment No. 1 with planter container 200 as described under the heading Alternative Embodiment No. 4, taking note of the absence of necessity for a sloped peripheral support surface. It will be recalled that soil support platform 220 rests upon inner container ledge 210 via peripheral support rim 227 and thus the sloped peripheral support surface 26 of soil support platform 20 may be omitted in the fifth embodiment.

Alternative Embodiment No. 6

A sixth alternative embodiment of the present invention expands upon the concepts and structures as described in connection with Alternative Embodiment No. 2. In this regard, it is contemplated that at least support spacer member be further defined by a plurality of nestable support spacer members as referenced at 70, 80, and 90 and as generally depicted in Figure Nos. 20-27, inclusive. As will be seen from an inspection of Figure Nos. 20-27, nestable support spacer members are essentially identical save for the overall size dimensions. In other words, nestable support spacer member has an outer diameter that is substantially equal to the inner diameter of nestable support spacer member 80. In turn, nestable support spacer member 80 has an outer diameter that is substantially equal to the inner diameter of nestable support spacer member 90. Nestable support spacer member has an outer diameter that is substantially equal to the select container periphery so that when nested together, nestable support spacer members 70, 80, and 90 and the soil support platform form a false bottom at the select container periphery.

As has been noted, planter containers have widely discrepant dimension specifications, the dimension variance often existing even among individual planter containers within the same model grouping. With this fact in mind, it is contemplated that nestable support spacer members 70, 80, and 90 function to serve as means for enabling users to more effectively position a false bottom at a select container periphery as well as means for enabling users to form a false bottom in planter containers having open mouth or inner container diameter dimensions that greatly exceed the dimensions of the superior support surface of the soil support platform.

Nestable support spacer members 70, 80, and 90 are each also preferably constructed from reground polystyrene and are formed to preferably comprise substantially planar superior spacer surfaces 72, 82, and 92 as respectively illustrated in Figure Nos. 20, 26, and 27; substantially planar inferior spacer surfaces 73, 83, and 93 as respectively illustrated in Figure Nos. 20, 25, 26, and 27; sloped outer peripheral surfaces 74, 84, and 94 as respectively illustrated in Figure Nos. 20, 24, and 25; sloped inner peripheral surfaces 75, 85, and 95 as respectively illustrated in Figure No. 20; a horizontal spacer thickness, upwardly extending structure support ridges 71, 81, and 91 as respectively illustrated in Figure Nos. 20, 24, 26, and 27; downwardly extending structure support ridges 76, 86, and 96 as respectively illustrated in Figure Nos. 20, 25, 26, and 27; and ridge-receiving grooves 77, 87, and 97 as respectively illustrated and referenced in Figure No. 20.

It will thus be seen from an inspection of Figure No. 20 that ridge-receiving grooves 77, 87, and 97 are respectively intermediate the upwardly extending structure support ridges 71, 81, and 91 and sloped inner peripheral surfaces 75, 85, and 95. In this regard, it will be further noted that ridge-receiving groove 77 has a slighter larger width than either ridge-receiving groove 87 or ridge-receiving groove 97. It should be noted that only the inner most support spacer member, which, as illustrated and referenced, is support spacer member 70, comprises a ridge-receiving groove 77 having sufficient width to snugly receive peripheral support ridge 23 of the support platform. In this last regard, the reader is directed to Figure Nos. 26 and 27. There it will be noted that peripheral support ridge 23 of an alternative soil support platform is snugly received by ridge-receiving groove 77 in Figure No. 26 and the peripheral support ridge 23 of soil support platform 20 is snugly received by ridge-receiving groove in Figure No. 27.

Ridge-receiving grooves 87 and 97 are designed to respectively receive downwardly extending structure support ridges 86 and 96 when the given support spacer members are nested together as is further generally illustrated in Figure Nos. 26 and 27. It will thus be understood that a plurality of nestable support spacer members may thus be nested together to enable the user to form a false bottom at a select container periphery.

It will be understood that superior spacer surfaces 72, 82, and 92 are preferably substantially parallel with inferior spacer surfaces 73, 83, and 93, and that inner peripheral surfaces 75, 85, and 95 are concentric within the outer peripheral surfaces 74, 84, and 94. Notably, inner peripheral surfaces 75, 85, and 95 each have a platform-engaging depth that coincides with the spacer member-engaging depth of the given soil support platform as comparatively shown in Figure Nos. 26 and 27. When inserted into a planter container, outer peripheral surface 94 is in removably wedged engagement with the select container periphery. In this alternative embodiment, however, peripheral support surface 26, when inserted into support spacer member 70, is in removably wedged engagement with inner peripheral surface 75 and peripheral support rim 27 is in removably seated engagement with ridge-receiving groove 77. The spacer-engaging depth thus preferably coincides with the platform-engaging depth of each support spacer member such that superior support surface 21 is substantially coplanar with superior spacer surfaces 72, 82, and 92. Thus, it will be understood that soil support platform 20 or an alternative soil support platform and support spacer members 70, 80, and 90 together form a substantially planar false bottom in the oversized planter container at the select container periphery.

In other words, it is contemplated that the presently described embodiment will comprise at least one nestable support spacer member, each nestable support spacer member comprising a substantially planar superior spacer surface, a substantially planar inferior spacer surface, a sloped inner peripheral surface, a sloped outer peripheral surface, a horizontal spacer thickness, an upwardly extending structure support ridge, and a downwardly extending structure support ridge. The superior spacer surface or surfaces being parallel with the inferior spacer surface or surfaces and the inner peripheral surface or surfaces being concentric within the outer peripheral surface or surfaces. The upwardly extending structure support ridge is preferably integrally formed to the inner peripheral surface and thus forms a ridge-receiving groove intermediate the upwardly extending structure support ridge and the inner peripheral surface. The peripheral support ridge of the given soil support platform is removably engaged with the ridge-receiving groove. The downwardly extending structure support ridge is integrally formed to the outer peripheral surface, which outer peripheral surface is removably engaged with a select sloped surface selected from the group consisting of the inner container surface (if just one support spacer member is being utilized) and an inner peripheral surface of a further support spacer member (if more than one support spacer member is being utilized). In the latter case, the downwardly extending structure support ridge of the first support spacer member is removably engaged with the ridge-receiving groove of the further support spacer member. It will thus be seen that the soil support platform and at least one support spacer member together in series form a substantially planar false bottom in the oversized planter container at the select sloped surface or select container periphery of the inner container surface.

In order to achieve a proper false bottom location at the select container periphery, which, as earlier specified, is preferably 6-8 inches from the container rim, the horizontal spacer thickness preferably has a magnitude ranging from 0.25 to 5 inches. For a circular support spacer member the horizontal spacer thickness is preferably about 0.375 inches. By inserting one support spacer member, the horizontal thickness will provide an increase in false bottom diameter of about 0.75 inches and thus enable the user to elevate the false bottom about 2-3 inches toward the container rim as earlier described. Optionally, each of the support spacer members 70, 80, and 90 may comprise ribbed inner peripheral surfaces 75, 85, and 95 as is generally illustrated in Figure Nos. 24 and 25 and as referenced at 100. It is contemplated that the ribbed inner peripheral surfaces 75, 85, and 95 may enable the manufacturer to reduce the amount of material used in construction of support spacer members 70, 80, and 90, thus further reducing manufacturing costs. It is contemplated that given a preferred horizontal thickness of 0.375 inches, each rib should have a width (contributory to the overall horizontal thickness) of about 0.25 inches, thus leaving the wall thickness as referenced at 101 in Figure No. 24 with an thickness of about 0.125 inches. Excellent results have been obtained using the ribbed inner peripheral surfaces 75, 85, and 95 as shown and described. It is noted that be including ribbed inner peripheral surfaces 75, 85, and 95 will effectively result in a plurality of matter-receiving cavities as referenced at 102 in Figure No. 20, 21(b), 22(b), 23(b), 26, and 27 around the perimeter of the false bottom. The matter-receiving cavities may thus serve as soil retaining pockets through which excess moisture may drain from the false bottom to the true container bottom.

It will be further understood the primary structural difference between support spacer members 70, 80, and 90 are the overall size dimensions (albeit support spacer member 70 comprises structurally enlarged ridge-receiving groove 77 as earlier described) as may be generally seen from an inspection of Figure Nos. 21(a) through 23(b). It should be noted that while the three nestable support spacer members 70, 80, and 90 have been described and illustrated, it is contemplated that additional nestable support spacer members may be added to the series of nestable spacer members. It is believed within the ordinary skill of those in the art to take the information as described herein and expand upon the same so as to nest more or less than three nestable support spacer members together so as to form the false bottom at the select container periphery.

It will be seen that the present invention further provides a low cost, container insert or insert assembly designed for use in combination with an oversized planter container for creating a false bottom in the same. In this regard, it will be further seen that the present invention provides a container insert or insert assembly designed for use in combination with an oversized planter container that will enable the user to decrease the amount of soil needed to effectively maintain plant life in a viable state. It will be further seen that the present invention provides a false bottom insert for an oversized planter container that will function to reduce the need to have excess stone, excess soil, or other types of excess fill material in those portions of an oversized planter container where root systems of plant life may not reach.

Still further, it will be seen that the present invention provides a soil support platform that comprises a substantially planar superior support surface, a substantially planar inferior support surface, a peripheral support ridge, and a plurality of support ribs for supporting soil in an elevated position above an oversized planter container bottom. Further, it will be seen that the present invention provides a false bottom insert assembly that will function to reduce the overall mass of an oversized planter container when excess stone, excess soil or other types of excess or unnecessary fill material are placed into the containers.

It will be further seen that the present invention provides a false bottom insert assembly that enables users to more effectively position a false bottom at a user-selected or select container periphery. Further, it will be seen that the present invention provides a false bottom insert assembly that enables users to form a false bottom in a planter container having a mouth or inner container diameter dimension that greatly exceeds the dimensions of the superior support surface of the soil support platform. In this regard, the present invention provides a support spacer member comprising a substantially planar superior spacer surface, a substantially planar inferior spacer surface, a sloped outer peripheral surface, a sloped inner peripheral surface, a horizontal spacer thickness, and a platform support ridge that is designed to engage the container at the select container periphery and receive and support the soil support platform.

It will be further seen that the present invention provides a false bottom insert assembly comprising a plurality of matter-receiving apertures. More specifically, it will be seen that the present invention provides a false bottom insert assembly that enables the user to prevent root rot by allowing excess moisture to drain from soil-bound root systems through moisture drain apertures in the insert assembly. Still further, it will be seen that the present invention provides an optional moisture-receiving tray usable in combination with a soil support platform and the support spacer member for capturing and retaining excess moisture from the matter-receiving or moisture drain apertures of the soil support platform. In this regard, it will be seen that the present invention provides an optional moisture-receiving tray comprising a superior moisture-collecting tray surface, an inferior tray surface, a peripheral tray surface or rim, and a plurality of tray ribs. Thus, it will be seen that present invention provides a moisture-receiving tray that operates to provide a readily available moisture source in inferior adjacency to the root systems of plants requiring relatively large amounts of moisture. Further, it will be seen that the present invention provides a readily available moisture source in inferior adjacency to the root systems of plants requiring lesser amounts of moisture to effectively enable the user to increase the interval time between watering episodes.

While the above description contains much specificity, this specificity should not be construed as limitations on the scope of the invention, but rather as an exemplification of the invention. For example, it will be noted that matter-receiving apertures 25 are defined as structure capable of receiving a broad variety of matter as directed therethrough, including, but not limited to, moisture, soil, members, straps or other means for manual removal. Further, as has been described above, the general concept of a moisture-receiving tray, suspendable in inferior adjacency to the soil support platform may be practiced by a variety of means. The specified means for supporting the moisture-receiving tray in inferior adjacency to the soil support platform as disclosed and described herein have proven to be cost effective and functionally sound. This is not to suggest that other means do not exist. It is thus contemplated that the general concept of providing an optional moisture-receiving tray for use in combination with a soil support platform as described is taught by the present invention and thus so long as a moisture-receiving tray is formed for use in combination with a soil support platform substantially as described, it is believed that the spirit of the present invention is practiced.

Further, as described under the heading ALTERNATIVE EMBODIMENT NO. 6, it is contemplated that more than one support spacer member may be utilized in tandem with one another. That is, a first support spacer member having dimensions for engagement with an inner container surface at the desired false bottom level may first be inserted into a planter container substantially as described herein. Then, a second support spacer member having dimensions for engagement with the first support spacer member may be inserted into or nested within the first support spacer member. In this fashion, it is contemplated that a plurality of concentric support spacer members may be nested together thus effectively forming an outer perimeter of a false bottom. As earlier described, the outer perimeter of the resulting false bottom may comprise matter-receiving cavities should the manufacturer elect to construct the several support spacer members with ribbed inner peripheral surfaces. To complete the false bottom, a soil support platform would be removably engaged with the last support spacer member added. It is further contemplated that a support spacer member resembling a grid like pattern could also be formed for insertion in a planter container at a desired depth from the container rim. A plurality of soil support platforms could then be inserted to fill the grid like pattern and thus complete a false bottom in the planter container. So long as the false bottom is formed utilizing the components as described herein, it is believed that the spirit of the present invention is practiced.

Further, it is contemplated that the peripheral support ridge of the support spacer member may simply comprise a peripheral support ledge and need not comprise a ridged structure as perhaps most clearly shown in Figure No. 10 at 65. Rather, while the peripheral support ridge of the support spacer member may be preferably configured as a tongue-like structure for insertion in the groove-like structure 23(*a*) adjacent peripheral support ridge 23 as referenced at 23(*a*) in Figure No. 7, it is contemplated that a support ledge will function to serve as a seat upon which peripheral support rim 27 may rest. Referencing Figure No. 8, it should be understood that peripheral support ridge 65 may be removed at inferior spacer surface 62 such that inferior spacer surface 62 terminates at the junction of inferior spacer surface 62 and peripheral support ridge 65, thus providing sufficient structure upon which to seat peripheral support rim 27. It should be noted, however, that peripheral support ridge, provides a more secure seat for the soil support platform and thus it is recommended that the invention be practices as earlier described herein.

Accordingly, although the invention has been described by reference to a preferred embodiment and several described alternative embodiments, it is not intended that the novel assembly be limited thereby, but that modifications thereof are intended to be included as falling within the broad scope and spirit of the foregoing disclosure, the following claims and the appended drawings.

We claim:

1. A container insert for creating a false bottom in a planter container comprising a container bottom, a container rim, and a non-uniform inner container surface, the inner container surface extending from the container bottom to the container rim, the inner container surface comprising an inner container ledge and a select container periphery intermediate the container bottom and the container rim, the container insert comprising:

a substantially planar superior support surface, a substantially planar inferior support surface, a peripheral support ridge, a plurality of solid support ribs, and a plurality of matter-receiving apertures, the peripheral support ridge comprising a sloped peripheral support surface and a peripheral support rim, the peripheral support surface being intermediate the superior support surface and the peripheral support rim, the peripheral support surface having a substantially uniform container-engaging depth, the support ribs being integrally formed to the inferior support surface and substantially equally spaced from one another, the matter-receiving apertures being spaced intermediate the support ribs and extending from the superior support surface to the inferior support surface, the inferior support surface comprising a tray support structure, the tray support structure being concentric within the peripheral support ridge, the tray support structure comprising tray-supporting means, the peripheral support surface being in removably wedged engagement with the select container periphery, the peripheral support rim being in removably seated engagement upon the inner container ledge, the support ribs being elevated above the container bottom for maximizing the space intermediate the support ribs and the container bottom, the container insert thus being rib-supported and ledge-supported and forming an elevated, rib-ledge-supported false bottom in the planter container at a height above the inner container ledge, the height above the inner container ledge being defined by the container-engaging depth and the angle of the peripheral support surface.

2. A container insert for creating a false bottom in an oversized planter container comprising a container bottom, a container rim, and a non-uniform inner container surface, the inner container surface extending from the container bottom to the container rim, the inner container surface comprising an inner container ledge intermediate the container bottom and the container rim, the container insert comprising:

a substantially planar superior support surface, a substantially planar inferior support surface, a peripheral support ridge, a plurality of solid support ribs, and a plurality of matter-receiving apertures, the peripheral support ridge comprising a peripheral support rim, the support ribs being integrally formed to the inferior support surface and substantially equally spaced from one another, the matter-receiving apertures being spaced intermediate the support ribs and extending from the superior support surface to the inferior support surface, the inferior support surface comprising a tray support structure, the tray support structure being concentric within the peripheral support ridge, the tray support structure comprising tray-supporting means, the peripheral support rim being in removably seated engagement upon the inner container ledge, the support ribs being elevated above the container bottom for maximizing the space intermediate the support ribs and the container bottom, the container insert thus being rib-supported and ledge-supported and forming an elevated, rib-ledge-supported false bottom in the planter container adjacent the inner container ledge.

3. The container insert of claim 2 wherein the peripheral support ridge comprises a sloped peripheral support surface, the peripheral support surface being intermediate the superior support surface and the peripheral support rim, the peripheral support surface having a substantially uniform container-engaging depth, the peripheral support surface being in removably wedged engagement with a select container periphery, the height above the inner container ledge being defined by the container-engaging depth and the angle of the peripheral support surface.

* * * * *